United States Patent
Ectors et al.

(10) Patent No.: US 12,239,124 B2
(45) Date of Patent: Mar. 4, 2025

(54) COMPOSITIONS FOR CRYOPRESERVATION OF A BIOLOGICAL MATERIAL

(71) Applicant: Cryoport Belgium S.A., Villers-le-Bouillet (BE)

(72) Inventors: Fabien Ectors, Gesves (BE); Luc Grobet, Esneux (BE); Delphine Connan, Gesves (BE); Nadine Dupuis, Burg-Reuland (BE)

(73) Assignee: Cryoport Belgium S.A., Villers-le-Bouillet (BE)

( * ) Notice: Subject to any disclaimer, the term of this patent is extended or adjusted under 35 U.S.C. 154(b) by 854 days.

(21) Appl. No.: 17/421,134

(22) PCT Filed: Feb. 7, 2020

(86) PCT No.: PCT/EP2020/053065
§ 371 (c)(1),
(2) Date: Jul. 7, 2021

(87) PCT Pub. No.: WO2020/161273
PCT Pub. Date: Aug. 13, 2020

(65) Prior Publication Data
US 2022/0217969 A1    Jul. 14, 2022

(30) Foreign Application Priority Data
Feb. 7, 2019  (EP) ................................. 19155970

(51) Int. Cl.
*A01N 1/02*  (2006.01)
(52) U.S. Cl.
CPC .................. *A01N 1/0221* (2013.01)
(58) Field of Classification Search
None
See application file for complete search history.

(56) References Cited

U.S. PATENT DOCUMENTS

| 10,104,880 B2 | 10/2018 | Zeitlin et al. |
| 2002/0115054 A1 | 8/2002 | Forest et al. |
| 2003/0113706 A1 | 6/2003 | Forest et al. |
| 2006/0234204 A1 | 10/2006 | Forest et al. |
| 2015/0017628 A1 | 1/2015 | Gibson et al. |
| 2015/0320031 A1* | 11/2015 | Andreasen ........... A01N 1/0221 435/1.3 |
| 2018/0094232 A1 | 4/2018 | Toner et al. |
| 2019/0059360 A1 | 2/2019 | Gibson et al. |
| 2020/0077642 A1 | 3/2020 | Braslavsky et al. |
| 2023/0276788 A1 | 9/2023 | Wei |

FOREIGN PATENT DOCUMENTS

| BR | 102017003686 A2 * | 10/2018 |
| CA | 3001065 A1 | 4/2017 |
| CN | 1322467 A | 11/2001 |
| CN | 1727473 A | 2/2006 |
| CN | 101253856 A | 9/2008 |
| CN | 105229145 A | 1/2016 |
| CN | 107183008 A | 9/2017 |
| CN | 108 207 930 A | 6/2018 |
| CN | 108739796 A | 11/2018 |
| EP | 2644689 A1 | 2/2013 |
| JP | H10277067 A | 10/1998 |
| JP | 2012500021 A | 1/2012 |
| RU | 2678106 C2 | 1/2019 |
| WO | 2010021714 A2 | 2/2010 |
| WO | 2010046949 A1 | 4/2010 |
| WO | 2012070622 A1 | 5/2012 |
| WO | 2018/104935 A1 | 6/2018 |

OTHER PUBLICATIONS

Fu-fu Zheng et al., "Comparison of Efficacy Between Two Vitrification Solutions for Mouse Morulae," Reproduction & Contraception, vol. 25, No. 8, pp. 456-459, Aug. 31, 2005 (English Abstract).
PCT International Search Report dated Apr. 9, 2020 in connection with PCT International Patent Application No. PCT/EP2020/053065.
PCT Written Opinion of the International Search Authority dated Apr. 9, 2020 in connection with PCT International Patent Application No. PCT/EP2020/053065.
Melany Lopez et al: "Chemically Defined and Xeno-Free Cryopreservation of Human Adipose-Derived Stem Cells", PLOS ONE, vol. 11, No. 3, Mar. 24, 2016 (Mar. 24, 2016), p. e0152161, XP055592985, 15 pages.
Mudes De Castro M P et al: "Dextran vitrification media prevents mucin coat and zona pellucida damage in rabbit embryo", Theriogenology, vol. 74, No. 9, Dec. 1, 2010 (Dec. 1, 2010), pp. 1623-1628, XP027452206.
BR; Office Action dated Oct. 3, 2023 in Application Serial No. 112021015654.2.

(Continued)

*Primary Examiner* — Brian Gulledge

(57) ABSTRACT

The present application discloses a liquid composition for cryopreservation of a biological material comprising a polar aprotic solvent, a monohydric or polyhydric alcohol, an unbranched polysaccharide, a branched polysaccharide; and polyvinyl alcohol. Further provided are uses of said liquid composition for cryopreservation of abiological material and methods for preserving a biological material using said liquid composition.

13 Claims, 5 Drawing Sheets

(56) References Cited

OTHER PUBLICATIONS

CN; Office Action dated Dec. 28, 2021 in Application Serial No. CN202080012902.
CN; 2nd Office Action dated May 18, 2022 in Application Serial No. CN202080012902.
CN; 3rd Office Action dated Nov. 22, 2022 in Application Serial No. CN202080012902.
CN; Decision of Rejection dated May 29, 2023 in Application Serial No. CN202080012902.
RU; Office Action dated Jul. 28, 2023 in Application Serial No. 2021126192.
JP; Office Action dated Oct. 10, 2023 in Application Serial No. 2021-569590.
CA; Office Action dated Sep. 14, 2023 in Application Serial No. 3126266.
PH; Notice of Allowance dated Apr. 11, 2024 in Application Serial No. 12021551875.
PCT; International Preliminary Report on Patentability dated Aug. 10, 2021 in Application Serial No. PCT/EP2020/053065.
IL; Notice of Allowance dated Jan. 17, 2024 in Application Serial No. 285337.

* cited by examiner

COMPOSITIONS FOR CRYOPRESERVATION OF A BIOLOGICAL MATERIAL

CROSS-REFERENCE TO RELATED APPLICATIONS

This application is a U.S. national stage entry under 35 U.S.C. § 371 of PCT International Patent Application No. PCT/EP2020/053065, filed Feb. 7, 2020, which claims priority to European Patent Application No. 19155970.7, filed Feb. 7, 2019, the contents of each of which are incorporated herein by reference in their entirety.

FIELD

The present invention relates to liquid compositions for cryopreservation of a biological material, methods employing these compositions and uses thereof. The present invention is particularly useful for cryopreservation of human cells, gametes and embryos.

BACKGROUND

Cryopreservation is amongst the most powerful and efficient tools for indefinitely preserving the genetics of economically, therapeutically or scientifically important cells, embryos or gametes. This applies for human assisted reproduction technologies (ART) as well. Since water is the major component of the cell, its solidification must be tightly controlled during both cooling and subsequent warming to avoid intracellular formation of ice crystals. This would have destructive effects on organelles and all membrane systems ending up with cell deleterious alterations and death.

Two main groups of methods are currently in use for cryopreserving live biological material: slow freezing (SLF) and vitrification (VIT). The VIT procedures were introduced as an alternative to SLF in order to reduce the likelihood of intracellular ice crystal formation (Rall and Fahy 1985).

VIT has been demonstrated as more efficient than SLF in human ART, particularly for cryopreserving metaphase II (MID) oocytes (Kuwayama et al. 2005), and embryos at various developmental stages (Rienzi et al. 2017; Vanderzwalmen et al. 2012), standing now as the gold standard for cryopreservation in ART.

This is equally true for animal and particularly murine embryos, where VIT has been shown to better preserve chromatin integrity and bioenergy status (Somoskoi et al. 2015), induce lower intracellular ingress of cryoprotectants (CPs) (Vanderzwalmen et al. 2013) and ultimately yield better embryo survival and development than SLF (Zander-Fox et al. 2013).

Nevertheless, current VIT protocols suffer from methodological complexity, multiplicity of protocols and frequent use of chemically undefined components often originating from human or animal fluids. As a consequence thereof, stability of the components, biological safety, reproducibility and standardization of the processes are compromised.

In view thereof, there is a need for further and/or improved compositions for vitrifying—and also slow freezing-cells with high efficacy, biological safety and reproducibility.

SUMMARY

Present inventors developed a unique chemically defined liquid composition for cryopreservation of a biological material. The inventors have found that the specific combination of reagents allows a synergistic effect of these reagents resulting in optimal characteristics for use in cryopreservation.

More particularly, the use of the compositions of the invention ensures a better survival and hatching rate than known cryopreservation solutions.

This liquid composition allows efficient, biologically safe and reproducible cryopreservation (e.g. vitrification) of various types of biological material, encompassing—but not limited to—stem cells, embryos and gametes, by various types of cryopreservation procedures (e.g. slow freezing, one-step vitrification, multi-step vitrification).

Accordingly, a first aspect provides a liquid composition for cryopreservation of a biological material comprising a polar aprotic solvent, a monohydric or polyhydric alcohol and a polyvinyl alcohol. In particular embodiments, the composition comprises:
- a polar aprotic solvent selected from dimethylsulfoxide (DMSO) and dimethylformamide (DMF)
- a monohydric or polyhydric alcohol selected from ethylene glycol, propylene glycol, glycerol, erythritol, sorbitol, mannitol, xylitol, volemitol, methanol, ethanol, isopropanol, butanol and pentanol;
- an unbranched polysaccharide selected from the group consisting of sucrose, trehalose, lactulose, melibiose, lactobionate, raffinose and cellulose, preferably sucrose;
- a branched polysaccharide selected from the group consisting of dextran, pectin, ficoll and starch, preferably dextran; and
- polyvinyl alcohol.

In particular embodiments, the liquid composition for cryopreservation of a biological material comprises DMSO, ethylene glycol, sucrose, dextran and polyvinyl alcohol.

In particular embodiments, the liquid composition for cryopreservation of a biological material comprises substantially equal amounts of DMSO and ethylene glycol and a concentration of sucrose which is at least 8 times that of dextran.

In particular embodiments, the liquid composition for cryopreservation of a biological material comprises:
- at least 0.8% (v/v) of a polar aprotic solvent;
- at least 0.8% (v/v) of a monohydric or polyhydric alcohol;
- at least 0.5% (w/v) of unbranched polysaccharide;
- at least 0.037% (w/v) of a branched polysaccharide;
- at least 0.015% (w/v) polyvinyl alcohol; and
- up to 100% (v/v) of a diluent, preferably with pH 7.2-7.4.

In a preferred embodiment, the liquid composition for cryopreservation of a biological material comprises:
- at least 0.8% (v/v) of a polar aprotic solvent;
- at least 0.8% (v/v) of a monohydric or polyhydric alcohol;
- at least 0.5% (w/v) of unbranched polysaccharide;
- at least 0.037% (w/v) of dextran;
- at least 0.015% (w/v) polyvinyl alcohol; and
- up to 100% (v/v) of a diluent, preferably with pH 7.2-7.4.

In particular embodiments, the liquid composition for cryopreservation of a biological material comprises:
- 13.0-23.0% (v/v), preferably 17.7% (v/v) of a polar aprotic solvent;
- 13.0-23.0% (v/v), preferably 17.7% (v/v), of a monohydric or polyhydric alcohol;
- 9.0-31.0% (w/v), preferably 22.7% (w/v), of an unbranched polysaccharide;
- 0.60-22.0% (w/v), preferably 2.64% (w/v), of a branched polysaccharide;

0.30-4.0% (w/v), preferably 0.88% (w/v), polyvinyl alcohol; and/or up to 100% (v/v) of a diluent, preferably with pH 7.2-7.4; or a dilution of said liquid composition in said diluent.

In a preferred embodiment, the liquid composition for cryopreservation of a biological material comprises:
- 13.0-23.0% (v/v), preferably 17.7% (v/v) of a polar aprotic solvent;
- 13.0-23.0% (v/v), preferably 17.7% (v/v), of a monohydric or polyhydric alcohol;
- 9.0-31.0% (w/v), preferably 22.7% (w/v), of an unbranched polysaccharide;
- 0.60-22.0% (w/v), preferably 2.64% (w/v), of dextran;
- 0.30-4.0% (w/v), preferably 0.88% (w/v), polyvinyl alcohol; and/or
- up to 100% (v/v) of a diluent, preferably with pH 7.2-7.4; or a dilution of said liquid composition in said diluent.

In particular embodiments, the liquid composition for cryopreservation of a biological material comprises at least 15% (v/v) of a polar aprotic solvent, at least 15% (v/v) of a monohydric or polyhydric alcohol, at least 15% (w/v) of an unbranched polysaccharide, at least 2% (w/v) of a branched polysaccharide and about 0.9% (w/v) polyvinyl alcohol.

In a preferred embodiment, the liquid composition for cryopreservation of a biological material comprises at least 15% (v/v) of a polar aprotic solvent, at least 15% (v/v) of a monohydric or polyhydric alcohol, at least 15% (w/v) of an unbranched polysaccharide, at least 2% (w/v) of dextran and about 0.9% (w/v) polyvinyl alcohol.

In particular embodiments, said diluent is a balanced salt solution, preferably phosphate buffered saline (PBS).

In particular embodiments, dextran comprises one or more of Dextran 1, Dextran 40 and Dextran 70.

In particular embodiments, the liquid composition for cryopreservation of a biological material comprises:
- 17.7% (v/v) DMSO,
- 17.7% (v/v) ethylene glycol,
- 22.7% (w/v) sucrose,
- 0.88% (w/v) dextran 1 (D1)
- 0.88% (w/v) dextran 40 (D40)
- 0.88% (w/v) dextran 70 (D70); and
- 0.88% (w/v) polyvinyl alcohol.

In particular embodiments, the liquid composition does not comprise proteins, polypeptides or peptides.

A further aspect provides the use of the liquid composition as taught herein for cryopreservation of a biological material.

In particular embodiments, the cryopreservation of the biological material is performed by a freezing procedure, a multi-step vitrification procedure or a one-step vitrification procedure.

A further aspect provides a method for preserving a biological material comprising the steps of
- providing a biological material;
- contacting the biological material with the liquid composition as taught herein;
- cooling and/or heating the biological material in the liquid composition as taught herein. In particular embodiments, the method further comprises contacting the biological material with at least one dilution of the liquid composition as taught herein, before contacting the biological material with said composition.

In particular embodiments, said cooling comprises freezing the biological material or vitrification of the biological material.

In particular embodiments, said method comprises one-step or multi-step vitrification of the biological material.

In particular embodiments, the biological material is selected from the group of stem cells, gametes and embryos.

DESCRIPTION

Figure 1:
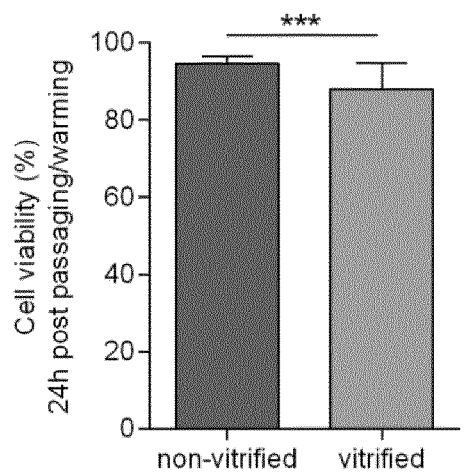
FIG. 1 represents the viability and confluency of the Mesenchymal stem cells isolated from equine cadaver (EC-MSCs) after one-step vitrification using the liquid composition (also referred to herein as cryopreservation solution (CDCS)) as taught herein. A: Cell Viability of EC-MSCs 24 h post warming (vitrified samples: mean=87.9%) or post passaging (non-vitrified samples: mean 94.5%) determined by trypan blue exclusion assay. Data represent mean+standard deviation (SD) of 15 and 20 samples (non-vitrified and vitrified, respectively) from 5 independent experiments. (Mann-Whitney test: P<0.001); B to F: Comparison of EC-MSCs confluency, reflecting the number of viable cells as well as their capability to proliferate, between vitrified and non-vitrified samples in 5 independent experiments. Data points represent mean±SD; the number of samples in each group is indicated between brackets.
Figure 1:
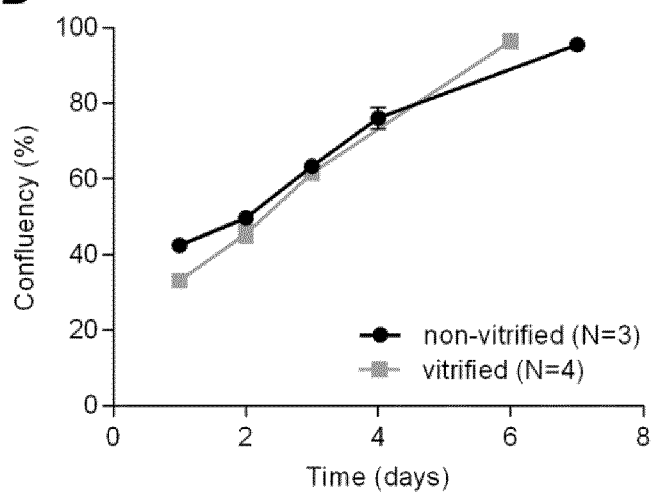
Figure 1:
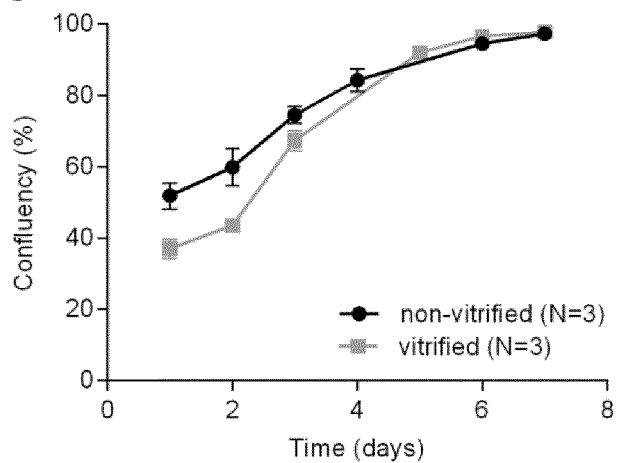
Figure 1:
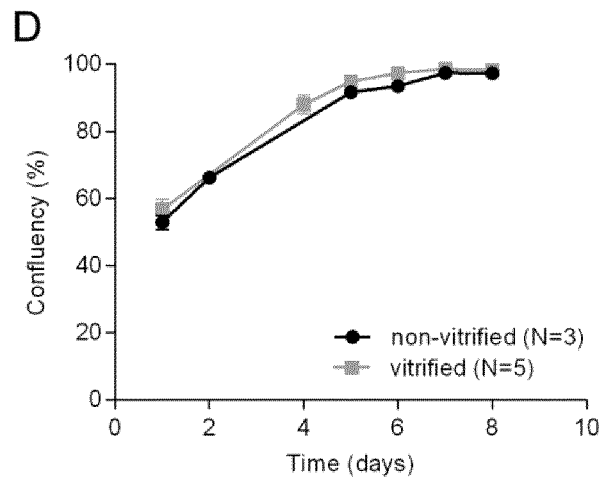
Figure 1:
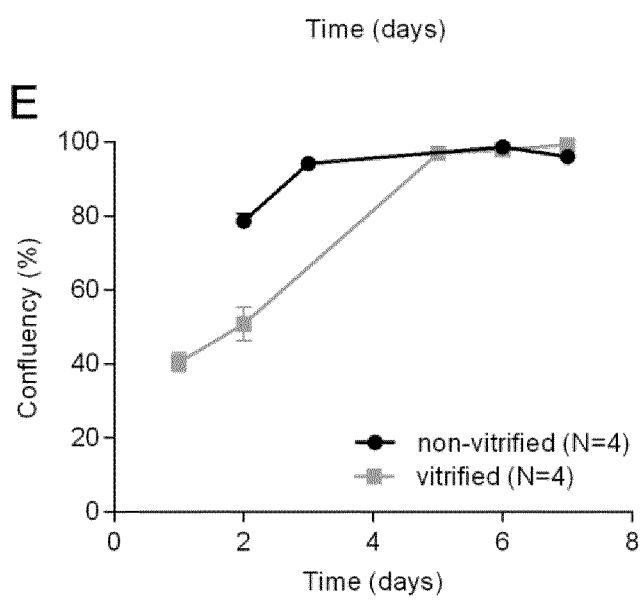
Figure 1:
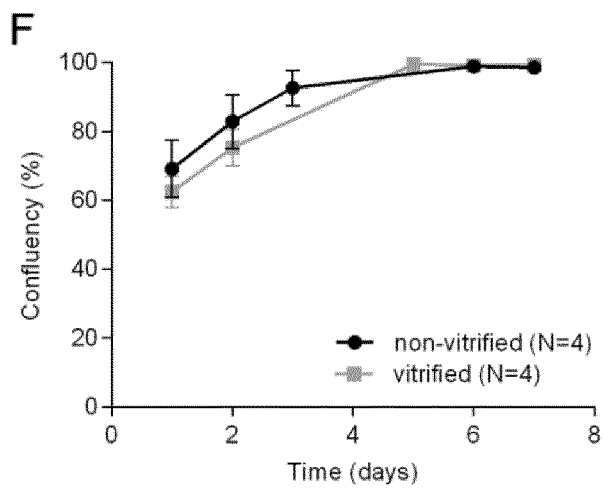

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms also encompass "consisting of" and "consisting essentially of". The term "consisting of" as used herein when referring to a composition means that no other ingredients are present in said composition than those recited thereafter. The term "consisting essentially of" when referring to a composition allows for the presence of trace reagents, but typically at a concentration of less than 0.1 w/v %.

The recitation of numerical ranges by endpoints includes all numbers and fractions subsumed within the respective ranges, as well as the recited endpoints.

The terms "about" or "approximately" as used herein when referring to a measurable value such as a parameter, an amount, a temporal duration, and the like, are meant to encompass variations of and from the specified value, such as variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Whereas the terms "one or more" or "at least one", such as one or more members or at least one member of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members. In another example, "one or more" or "at least one" may refer to 1, 2, 3, 4, 5, 6, 7 or more.

The discussion of the background to the invention herein is included to explain the context of the invention. This is not to be taken as an admission that any of the material referred to was published, known, or part of the common general knowledge in any country as of the priority date of any of the claims.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the invention. When specific terms are defined in connection with a particular aspect of the invention or a particular embodiment of the invention, such connotation is meant to apply throughout this specification, i.e., also in the context of other aspects or embodiments of the invention, unless otherwise defined.

In the following passages, different aspects or embodiments of the invention are defined in more detail. Each aspect or embodiment so defined may be combined with any other aspect(s) or embodiment(s) unless clearly indicated to the contrary. In particular, any feature indicated as being preferred or advantageous may be combined with any other feature or features indicated as being preferred or advantageous.

Reference throughout this specification to "one embodiment", "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

Present inventors developed a unique chemically defined liquid composition for cryopreservation of a biological material. The inventors have found that the specific combination of reagents allows a synergistic effect of these reagents resulting in optimal characteristics for use in cryopreservation.

As detailed herein, the compositions of the present invention comprise, consist essentially of or consist of a polar aprotic solvent (e.g. dimethylsulfoxide (DMSO)), a monohydric or polyhydric alcohol (e.g. ethylene glycol), an unbranched polysaccharide (e.g. sucrose) and a branched polysaccharide (e.g. dextran), and polyvinyl alcohol (PVA) ((the liquid composition is also referred to herein as a cryopreservation solution (CDCS)). This liquid composition allows efficient, biologically safe and reproducible cryopreservation (e.g. vitrification) of various types of biological material, encompassing—but not limited to—stem cells, embryos and gametes, by various types of cryopreservation procedures (e.g. slow freezing, one-step vitrification, multi-step vitrification). More particularly, the liquid composition allows efficient cryopreservation (e.g. vitrification) of biological material generally with viability, proliferation and morphological endpoints either similar to uncryopreserved control biological material, or similar or better than biological material cryopreserved with a reference control cryopreservation solution.

All ingredients of the composition as taught herein are chemically defined substances, not originating from animal nor human tissues or fluids (e.g. serum, albumin or any other serum protein). Therefore, their characteristics are intrinsically steady across production batches. Additionally, the properties of the liquid composition as taught herein are remarkably stable along time, even in unfavorable temperature conditions and in spite of the absence of any antimicrobial agent. Indeed, storage at 4° C. as well as at 37° C. (and also in intermediate and mixed temperature conditions) for at least 6 months does not alter its optical/physical aspect nor its high efficiency in cryopreserving biological material, which is an advantage for standardization and quality control purposes.

Furthermore, the liquid composition as taught herein acts as an ice crystal inhibiting composition, which is more effective than commonly used compositions for vitrification, even in conditions with cooling and warming rates which are slower than generally recommended, as well as when using cryovials. For instance, vitrification in cryovials typically has an average cooling or warming rate of about 100° C./min (e.g. as described in Tao Wang et al., 2015, Determination of convective heat transfer coefficient at the outer surface of a cryovial being plunged into liquid nitrogen. Cryoletters. 36:285-288), which is considerably lower than the commonly recommended cooling or warming rate from 2000° C. to 20 000° C. per minute for vitrification purposes. When testing the vitrification ability of the liquid composition as taught herein in high thermal inertia conditions (e.g. French straws filled with solution) and in absence of cells, no ice crystals are optically detectable upon cooling or subsequent warming of the liquid composition for cryopreservation, while on the other hand a reference vitrification solution and the liquid composition as taught herein devoid of PVA do not allow consistent vitrification, and result in fast crystal formation upon cooling or warming, which may be deleterious to the biological material.

It addition to efficiency, its chemically defined composition warrants reproducibility of its manufacturing properties and high mid- to long-term stability, which is an asset for standardization and quality control purposes. The absence of complex proteins or undefined components of human- or animal origin complies to biological safety requirements.

Accordingly, a first aspect provides a liquid composition for cryopreservation of a biological material comprising, consisting essentially of, or consisting of a polar aprotic solvent, a monohydric or polyhydric alcohol, an unbranched polysaccharide, a branched polysaccharide, and polyvinyl alcohol. The term "polar aprotic solvent" as used herein refers to a solvent consisting of polar molecules that do not contain labile hydrogen ions with positive charge. Polar aprotic solvents are typically capable of forming hydrogen bonds with water to dissolve in water whereas non polar solvents are not capable of strong hydrogen bonds. Non-limiting examples of polar aprotic solvents are DMSO, dimethylformamide, dichloromethane, tetrahydrofuran, ethyl acetate, acetonitrile, dimethylformamide, acetone, and hexamethylphosphoric triamide.

In particular embodiments, the polar aprotic solvent is selected from the group consisting of dimethylsulfoxide (DMSO), dimethylformamide (DMF), preferably DMSO.

The term "monohydric alcohol" as used herein refers to an organic compound with one alcohol functional group (i.e. one hydroxyl (—OH) group). Non-limiting examples of monohydric alcohols include methanol, ethanol, isopropyl alcohol (isopropanol), butanol and pentanol.

The term "polyhydric alcohol" as used herein refers to an organic compound with more than one alcohol functional group (i.e. more than one hydroxyl (—OH) group). Non-limiting examples of polyhydric alcohols include ethylene glycol, propylene glycol, glycerol, erythritol, sorbitol, mannitol, xylitol and volemitol.

As used herein, the singular form "monohydric or polyhydric alcohol" includes both singular and plural referents unless the context clearly dictates otherwise. When monohydric or polyhydric alcohol is used to refer to a combination of different types of monohydric and/or polyhydric alcohols, the total amount of the different types of monohydric and/or polyhydric alcohols, respectively, will not be higher than the amount of the monohydric or polyhydric alcohol in the liquid composition as taught herein. In particular embodiments, the monohydric or polyhydric alcohol is selected from the group consisting of ethylene glycol, methanol, ethanol, isopropyl alcohol (isopropanol), butanol, pentanol, propylene glycol, glycerol, erythritol, sorbitol, mannitol, xylitol and volemitol, preferably the monohydric or polyhydric alcohol is ethylene glycol, propylene glycol or glycerol, more preferably ethylene glycol.

The term "polysaccharide" as used herein refers to a branched or unbranched homo- or heterodimer (i.e., 2 monosaccharides, also known as disaccharide), -oligomer or -polymer (i.e. more than 20 monosaccharides, also known as polysaccharide) of monosaccharides. The monosaccharides can be combined through glycosidic bonds. Non-limiting examples of polysaccharides as defined herein include sucrose, trehalose, lactulose, melibiose, lactobionate, raffinose, dextran, pectin, ficoll, starch, cellulose and derivatives thereof such as hydroxyethyl starch and methylcellulose.

In particular embodiments, the unbranched polysaccharide is selected from the group consisting of sucrose, trehalose, lactulose, melibiose, lactobionate, raffinose and cellulose or a derivative thereof such as methylcellulose, preferably sucrose.

In particular embodiments, the branched polysaccharide is selected from the group consisting of dextran, pectin, ficoll and starch or a derivative thereof such as hydroxyethyl starch, preferably dextran. In particular embodiments, the unbranched polysaccharide is sucrose and the branched polysaccharide is dextran.

The term "polyvinyl alcohol", "PVA", "PVOH" or "PVAl" as used herein refers to the water-soluble synthetic polymer defined by the chemical formula $[CH_2CH(OH)_n]$. Polyvinyl alcohol can also be identified by CAS number 9002-89-5.

The term "cryopreservation" as used herein refers to a process where a biological material (e.g. cells, tissue, organs, organisms) is preserved in an environment with a temperature below 0° C., preferably below −80° C. (e.g. using solid carbon dioxide), even more preferably below −130° C. (e.g. using liquid nitrogen). The biological material is typically susceptible to damage caused by unregulated biochemical kinetics. At temperatures below −130° C., any enzymatic, biochemical activity which might damage the biological material is effectively stopped. During cryopreservation procedures, the biological material to be preserved by cooling or freezing is typically contacted with one or more cryoprotectants. Cryopreservation may be obtained by any cryopreservation procedure known in the art, including freezing procedures such as slow freezing (SLF) and vitrification procedures such as multi-step vitrification and one-step vitrification as described elsewhere herein.

The term "biological material" as used herein refers to cells, cell aggregates, tissue samples, organs, biological fluids, (multi)cellular organisms and any other membranous (e.g. liposome), nucleotidic (DNA or RNA), nucleoproteic (viruses), lipidic or proteinaceous entities. Non-limiting examples of biological material include stem cells (e.g. mesenchymal stem cells or induced pluripotent stem cells), gametes (e.g. sperm, oocytes, ova), embryo (i.e. at various developmental stages, e.g. zygote, two-cell, morula, blastocyst), whole blood or fractions thereof (e.g. white blood cells, red blood cells, plasma, platelets, proteins lipids, antibodies), bone marrow, bacteria, yeast, nematodes, membranous bodies, nucleic acids (DNA and RNA) and viruses.

In particular embodiments, the biological material is selected from the group of stem cells, gametes and embryos. Preferably, the biological material is an embryo, preferably a mouse or human embryo. The term "stem cell" refers generally to an unspecialized or relatively less specialized and proliferation-competent cell, which is capable of self-renewal, i.e., can proliferate without differentiation, and which or the progeny of which can give rise to at least one relatively more specialized cell type. The term encompasses stem cells capable of substantially unlimited self-renewal, i.e., wherein the progeny of a stem cell or at least part thereof substantially retains the unspecialized or relatively less specialized phenotype, the differentiation potential, and the proliferation capacity of the mother stem cell, as well as stem cells which display limited self-renewal, i.e., wherein the capacity of the progeny or part thereof for further proliferation and/or differentiation is demonstrably reduced compared to the mother cell. By means of example and not limitation, a stem cell may give rise to descendants that can differentiate along one or more lineages to produce increasingly relatively more specialized cells, wherein such descendants and/or increasingly relatively more specialized cells may themselves be stem cells as defined herein, or even to produce terminally differentiated cells, i.e., fully specialized cells, which may be post-mitotic.

The term "induced pluripotent stem cells" or "iPS cells" as used herein refers to pluripotent stem cells generated from adult cells by reprogramming. iPS cells can self-renew and can give rise to cell types originating from all three germ layers of an organism, i.e., mesoderm, endoderm, and ectoderm, and potentially to any and all cell types of an organism, although not able of growing into the whole organism. Examples of iPS cells are those as taught inter alia by Yamanaka et al. 2006 (Cell 126: 663-676) and Yamanaka et al. 2007 (Cell 131: 861-872).

As used herein, the qualifier "pluripotent" denotes the capacity of a cell to give rise to cell types originating from all three germ layers of an organism, i.e., mesoderm, endoderm, and ectoderm, and potentially capable of giving rise to any and all cell types of an organism.

In particular embodiments, the stem cells are multipotent stem cells selected from the group consisting of mesenchymal stem cells (MSCs), blood-derived stem cells (BDSCs), umbilical cord-blood derived stem cells (UCBSCs) and bone marrow-derived stem cells (BMSCs). In preferred embodiments, the cells are MSCs.

The term "mesenchymal stem cell" or "MSC" as used herein refers to an adult, mesoderm-derived stem cell that is capable of generating cells of mesenchymal lineages, typically of two or more mesenchymal lineages, more typically three or more mesenchymal lineages, e.g., chondro-osteoblastic (bone and cartilage), osteoblastic (bone), chondroblastic (cartilage), myocytic (muscle), tenocytic (tendon), fibroblastic (connective tissue), adipocytic (fat) and stromogenic (marrow stroma) lineage. MSC may be isolated from a biological sample, preferably a biological sample of a human subject, e.g., bone marrow, trabecular bone, blood, umbilical cord, placenta, foetal yolk sac, skin (dermis), specifically foetal and adolescent skin, periosteum, dental pulp, tendon and adipose tissue.

The term "MSC" also encompasses the progeny of MSC, e.g., progeny obtained by in vitro or ex vivo proliferation (propagation/expansion) of MSC obtained from a biological sample of an animal or human subject.

In particular embodiments, the biological material is a biological sample. The term "biological sample" or "sample" as used herein refers to a sample obtained from a biological source, e.g., from an organism, such as an animal or human subject, cell culture, tissue sample, etc. A biological sample of an animal or human subject refers to a sample removed from an animal or human subject and comprising cells thereof. The biological sample of an animal or human subject may comprise one or more tissue types and may comprise cells of one or more tissue types. Methods of obtaining biological samples of an animal or human subject are well known in the art, e.g., tissue biopsy or drawing blood. Human MSC, their isolation, in vitro expansion, and differentiation, have been described in, e.g., U.S. Pat. Nos. 5,486,359; 5,811,094; 5,736,396; 5,837,539; or 5,827,740.

The term "subject", "donor" or "patient" as used herein refers to animals, preferably warm-blooded animals, more preferably vertebrates, even more preferably mammals, still more preferably primates, and specifically includes humans and non-human mammals and primates. Preferred subjects are human subjects.

In particular embodiments, the biological material is one or more mammalian cells, preferably mouse or human cells, even more preferably human cells.

In particular embodiment, the biological material is biological material for assisted reproductive technologies (ART), such as metaphase II (MII) oocytes and embryos (e.g. embryos at various developmental stages).

In particular embodiments, the composition further comprises a diluent, preferably with pH 7.2-7.4.

In particular embodiments, said diluent is a balanced salt solution, preferably phosphate buffered saline (PBS), more preferably Dulbecco's PBS (D-PBS).

The term "a balanced salt solution" or "BSS" as used herein refers to a solution made to a physiological pH (preferably about pH 7.4) and isotonic salt concentrations. BSS typically comprises sodium, potassium, calcium, magnesium and chloride. Non-limiting examples of balanced salt solutions include PBS, HEPES, Alsever's solution, Earle's balanced salt solution (EBSS), Grey's balanced salt solution (GBSS), Hank's balanced salt solution (HBSS), Ringer's balanced salt solution (RBSS) and Tyrode's balanced salt solution (TBSS).

In particular embodiments, said diluent does not comprise any proteins, polypeptides or peptides.

The liquid compositions as taught herein are effective for cryopreservation of biological material. First, the combination of specific reagents, more particularly the monohydric or polyhydric alcohol, the unbranched polysaccharide, the branched polysaccharide and polyvinyl alcohol, which provides for an optimal cryopreservation. Moreover, the inventors have identified an optimal ratio of these different components of the polar aprotic solvent, which is effective in a wide range of concentrations. Accordingly, a stock solution (i.e. 1× concentrated, undiluted solution) can be prepared which can be further diluted in compositions with lower concentrations of the polar aprotic solvent, the monohydric or polyhydric alcohol, the unbranched polysaccharide, the branched polysaccharide and polyvinyl alcohol for specific uses.

Accordingly, the invention provides liquid compositions comprising a polar aprotic solvent, a monohydric or polyhydric alcohol, an unbranched polysaccharide, a branched polysaccharide, and polyvinyl alcohol and their use in the cryopreservation of a biological material.

In particular embodiments, the composition comprises 0.30-4.0% (w/v), 0.50-3.50% (w/v), 0.50-3.0% (w/v), 0.50-2.50% (w/v), 0.50-2.0% (w/v), 0.50-1.50% (w/v) or 0.50-1.0% (w/v), preferably 0.30-4.0% (w/v), of polyvinyl alcohol. In particular embodiments, the quantity of the unbranched polysaccharide in the composition is each at least 20 times that of polyvinyl alcohol. In particular embodiments, the quantity of the unbranched oligosaccharide in the composition is each at least 8 times that of the branched oligosaccharide.

In particular embodiments, the liquid composition or liquid stock composition (i.e. 1× concentrated, undiluted) as taught herein comprises, consists essentially of or consists of:

13.0-23.0% (v/v), 15.0-20.0% (v/v), 16.0-19.0% (v/v), 17.0-18.0% (v/v), preferably 13.0-23.0% (v/v), of the polar aprotic solvent, for example about 17.7% (v/v) of the polar aprotic solvent;

13.0-23.0% (v/v), 15.0-20.0% (v/v), 16.0-19.0% (v/v), 17.0-18.0% (v/v), preferably 13.0-23.0% (v/v), of the monohydric or polyhydric alcohol, for example about 17.7% (v/v) of the monohydric or polyhydric alcohol;

9.0-31.0% (w/v), 10-30% (w/v), 15-25% (w/v) or 20-25% (w/v) of the unbranched polysaccharide, for example about 22.7% (w/v) of the unbranched polysaccharide;

0.60-22.0% (w/v), 1.0-20.0% (w/v), 1.0-15.0% (w/v), 1.0-10.0% (w/v), 1.0-5.0% (w/v), 2.0-5.0% (w/v) or 2.0-3.0% (w/v) of the branched polysaccharide, for example about 2.64% (w/v) of the branched polysaccharide;

0.30-4.0% (w/v), 0.50-3.50% (w/v), 0.50-3.0% (w/v), 0.50-2.50% (w/v), 0.50-2.0% (w/v), 0.50-1.50% (w/v) or 0.50-1.0% (w/v), preferably 0.30-4.0% (w/v), of polyvinyl alcohol, for example about 0.88% (w/v) of polyvinyl alcohol; and up to 100% (v/v) of a diluent, preferably a balanced salt solution.

In particular embodiments, the liquid composition or liquid stock composition (i.e. 1× concentrated, undiluted) comprises, consists essentially of or consists of:
- at least 15% (v/v), at least 16% (v/v) or at least 17% (v/v) of the polar aprotic solvent,
- at least 15% (v/v), at least 16% (v/v) or at least 17% (v/v) of the monohydric or polyhydric alcohol,
- at least 15% (w/v), at least 16% (w/v), at least 17% (w/v), at least 18% (w/v), at least 19% (w/v), at least 20% (w/v), at least 21% (w/v) or at least 22% (w/v), of the unbranched polysaccharide;
- at least 2.0% (w/v), at least 2.10% (w/v), at least 2.20% (w/v), at least 2.30% (w/v), at least 2.40% (w/v), at least 2.50% (w/v) or at least 2.60% (w/v) of the branched polysaccharide, and
- about 0.9% (w/v) of polyvinylalcohol.

In particular embodiments, the composition may be a dilution of a stock composition in the same diluent as the stock composition as described above. Such dilution may be a 1:2 (i.e. 50%), 1:3 (i.e. about 33.3%), 1:4 (i.e. 25%), 1:5 (i.e. 20%), 1:6 (i.e. about 16.7%), 1:7 (i.e. about 14.3%), 1:8 (i.e. 12.5%), 1:9 (i.e. about 11.1%), 1:10 (i.e. 10%), 1:11 (i.e. about 9.1%), 1:12 (i.e. about 8.3%), 1:13 (i.e. about 7.7%), 1:14 (i.e. about 7.1%), 1:15 (i.e. about 6.7%) or 1:16 (i.e. about 6.3%) dilution in a diluent as described above, preferably a balanced salt solution.

In particular embodiments, the liquid composition (e.g. a dilution of a stock composition as described herein) comprises, consists essentially of or consists of:
- at least 0.8% (v/v), at least 1% (v/v), at least 1.2% (v/v), at least 1.6% (v/v), at least 2% (v/v), at least 4.0% (v/v) or at least 6.0% (v/v) of the polar aprotic solvent;
- at least 0.8% (v/v), at least 1% (v/v), at least 1.2% (v/v), at least 1.6% (v/v), at least 2% (v/v), at least 4.0% (v/v) or at least 6.0% (v/v) of the monohydric or polyhydric alcohol;
- at least 0.5% (w/v), at least 1% (w/v), at least 2% (w/v), at least 4% (w/v), at least 6% (w/v), at least 8% (w/v), at least 10% (w/v), at least 12% (w/v), at least 14% (w/v), at least 16% (w/v), at least 18% (w/v), at least 20% (w/v), at least 21% (w/v) or at least 22% (w/v) of the unbranched polysaccharide;
- at least 0.035% (w/v), at least 0.0750% (w/v), at least 0.150% (w/v), at least 0.30% (w/v), at least 0.60% (w/v), at least 1.0% (w/v), at least 1.50% (w/v), at least 2.0% (w/v), at least 2.10% (w/v), at least 2.20% (w/v), at least 2.30% (w/v), at least 2.40% (w/v), at least 2.50% (w/v) or at least 2.60% (w/v) of the branched polysaccharide;
- at least 0.015% (w/v), at least 0.1% (w/v), at least 0.2% (w/v), at least 0.3% (w/v), at least 0.4% (w/v), at least 0.5% (w/v), at least 0.6% (w/v), at least 0.7% (w/v) or at least 0.8% (w/v) of polyvinyl alcohol; and
- up to 100% (v/v) of a diluent, preferably a balanced salt solution.

In particular embodiments,
the polar aprotic solvent is selected from the group consisting of DMSO and dimethylformamide (DMF); the monohydric or polyhydric alcohol is selected from the group consisting of ethylene glycol, methanol, ethanol, isopropyl alcohol (isopropanol), butanol, pentanol, propylene glycol, glycerol, erythritol, sorbitol, mannitol, xylitol and volemitol, preferably ethylene glycol, propylene glycol or glycerol, more preferably ethylene glycol;

the unbranched polysaccharide is selected from the group consisting of sucrose, trehalose, lactulose, melibiose, lactobionate, raffinose and cellulose or a derivative thereof such as methylcellulose, preferably sucrose; and/or the branched polysaccharide is selected from the group consisting of dextran, pectin, ficoll and starch or a derivative thereof such as hydroxyethyl starch, preferably dextran.

Preferably, the invention provides a liquid composition for cryopreservation of a biological material comprising, consisting essentially of or consisting of DMSO, ethylene glycol, sucrose, dextran and polyvinyl alcohol.

The term "dimethylsulfoxide" or "DMSO" as used herein refers to an organosulfur compound with chemical formula $(CH_3)_2SO$. DMSO can be identified by CAS number 67-68-5.

The term "ethylene glycol", "EG" or "1,2-ethanediol" as used herein refers to an organic compound with chemical formula $(CH_2OH)_2$. Ethylene glycol can be identified by CAS number 107-21-1.

The term "sucrose" or "saccharose" or "sugar" or "SUC" as used herein refers to a disaccharide composed of glucose and fructose with chemical formula $C_{11}H_{22}O_{11}$. Sucrose can be identified by CAS number 57-50-1.

The term "dextran" as used herein refers to a complex branched glucan polysaccharide derived from the condensation of glucose. Dextran can be identified by CAS number 9004-54-0. Dextran chains may have varying lengths (e.g. from 1 to 2000 kDa). Different types of dextran can be indicated by their molecular weight (MW). For instance, non-limiting examples of dextrans with varying MW include dextran 1 (i.e. with a MW of about 1000 Da), dextran 5 (i.e. with a MW of about 5000 Da), dextran 12 (i.e. with a MW of about 12 000 Da), dextran 25 (i.e. with a MW of about 25 000 Da), dextran 40 (i.e. with a MW of about 40 000 Da), dextran 50 (i.e. with a MW of about 50 000 Da), dextran 60 (i.e. with a MW of about 60 000 Da), dextran 70 (i.e. with a MW of about 70 000 Da), dextran 80 (i.e. with a MW of about 80 000 Da), dextran 150 (i.e. with a MW of about 150 000 Da) and dextran 200 (i.e. with a MW of about 200 000 Da).

As used herein, the singular form "dextran" includes both singular and plural referents unless the context clearly dictates otherwise. When dextran is used to refer to a combination of different types of dextran, the total amount of the different types of dextran will not be higher than the amount of the branched polysaccharide in the liquid composition as taught herein.

In particular embodiments, the dextran present in the liquid composition as taught herein may herein comprises, consists essentially of or consists of only one type of dextran or a combination of different types of dextran, such as a combination of dextrans with a different MW.

In particular embodiments, the dextran present in the liquid composition as taught herein may herein comprises, consists essentially of or consists of only one type of dextran. In more particular embodiments, the dextran present in the liquid composition as taught herein comprises, consists essentially of or consists of dextran 1, dextran 40 or dextran 70. For example, the liquid composition as taught herein comprises, consists essentially of or consists of dextran 1.

In preferred embodiments, the dextran present in the liquid composition as taught herein comprises a combination of different molecular weight dextrans.

In more preferred embodiments, the dextran consists essentially of or consists of dextran 1, dextran 40 and dextran 70.

The ratio between the amounts of the different types of dextran (e.g. the different molecular weight dextrans) in the composition is not critical to the liquid composition of the invention.

Nevertheless, in particular embodiments, the dextran consists essentially of or consists of dextran 1, dextran 40 and dextran 70 in a 1:1:1, 2:1:1, 10:10:1 or 10:1:10 ratio, preferably a 1:1:1 ratio. An example of dextran 1 is dextran 1 of Pharmacosmos (ref 5510 0001 1007). An example of dextran 40 is dextran 40 of AppliChem (ref A2249). An example of dextran 70 is dextran 70 of AppliChem (ref A1847).

In particular embodiments, the liquid composition comprises substantially equal amounts of DMSO and ethylene glycol and a concentration of sucrose which is at least 8 times that of dextran.

In particular embodiments, the liquid composition comprises:
 substantially equal amounts of DMSO and ethylene glycol,
 a concentration of sucrose which is at least 8 times that of dextran, and
 a concentration of sucrose which is at least 20 times that of polyvinyl alcohol.

In particular embodiments, the liquid composition (e.g. a dilution of a stock composition as described herein) comprises:
 at least 0.8% (v/v), at least 1% (v/v), at least 1.2% (v/v), at least 1.6% (v/v), at least 2% (v/v), at least 4.0% (v/v) or at least 6.0% (v/v) of DMSO;
 at least 0.8% (v/v), at least 1% (v/v), at least 1.2% (v/v), at least 1.6% (v/v), at least 2% (v/v), at least 4.0% (v/v) or at least 6.0% (v/v) of ethylene glycol;
 at least 0.5% (w/v), at least 1% (w/v), at least 2% (w/v), at least 4% (w/v), at least 6% (w/v), at least 8% (w/v), at least 10% (w/v), at least 12% (w/v), at least 14% (w/v), at least 16% (w/v), at least 18% (w/v), at least 20% (w/v), at least 21% (w/v), at least 22% (w/v) of sucrose;
 at least 0.037% (w/v), at least 0.075% (w/v), at least 0.15% (w/v), at least 0.2% (w/v), at least 0.25% (w/v), at least 0.5% (w/v), at least 1% (w/v), at least 1.25% (w/v), at least 1.5% (w/v), at least 1.75% (w/v), at least 2% (w/v), at least 2.25% (w/v) or at least 2.5% (w/v) of dextran;
 at least 0.015% (w/v), at least 0.1% (w/v), at least 0.2% (w/v), at least 0.3% (w/v), at least 0.4% (w/v), at least 0.5% (w/v), at least 0.6% (w/v), at least 0.7% (w/v) or at least 0.8% (w/v) polyvinyl alcohol; and
 up to 100% (v/v) of a diluent, preferably with pH 7.2-7.4

In particular embodiments, the liquid composition or liquid stock composition (i.e. 1× concentrated, undiluted) comprises, consists essentially of or consists of:
 13.0-23.0% (v/v), 15.0-20.0% (v/v), 16.0-19.0% (v/v), 17.0-18.0% (v/v) or 13.0-23.0% (v/v) of DMSO, for example about 17.7% (v/v) of DMSO;
 13.0-23.0% (v/v), 15.0-20.0% (v/v), 16.0-19.0% (v/v), 17.0-18.0% (v/v) or 13.0-23.0% (v/v) of ethylene glycol, for example about 17.7% (v/v) of ethylene glycol;
 9.0-31.0% (w/v), 10.0-30.0% (w/v), 15.0-30.0% (w/v), 15.0-25.0% (w/v), 20.0-25.0% (w/v) or 22.0-23.0% (w/v), for example about 22.7% (w/v) sucrose;
 0.60-22.0% (w/v), 1.0-20.0% (w/v), 1.0-15.0% (w/v), 1.0-10.0% (w/v), 1.0-7.50% (w/v), 1.0-5.0% (w/v), 2.0-4.0% (w/v) or 2.0-3.0% (w/v), for example about 2.64% (w/v) dextran;
 0.30-4.0% (w/v), 0.50-3.50% (w/v), 0.50-3.0% (w/v), 0.50-2.50% (w/v), 0.50-2.0% (w/v), 0.50-1.50% (w/v) or 0.50-1.0% (w/v) of polyvinyl alcohol, for example about 0.88% (w/v) of polyvinyl alcohol; and/or
 up to 100% (v/v) of a diluent, preferably with pH 7.2-7.4

In particular embodiments, the composition or stock composition comprises, consists essentially of or consists of at least 15% (v/v) DMSO, at least 15% (v/v) ethylene glycol, at least 15% (w/v) sucrose, at least 2.5% dextran (w/v), about 0.9% (w/v) polyvinylalcohol and a diluent up to 100% (v/v).

In particular embodiments, the composition or stock composition comprises, consists essentially of or consists of about 17.7% (v/v) DMSO, about 17.7% (v/v) ethylene glycol, about 22.7% (w/v) sucrose, about 0.88% dextran 1 (w/v), about 0.88% dextran 40 (w/v), about 0.88% dextran 70 (w/v), about 0.88% (w/v) polyvinyl alcohol and D-PBS up to 100% (v/v).

In particular embodiments, the liquid composition does not comprise any proteins, polypeptides or peptides, preferably the liquid composition does not comprise any proteins, polypeptides or peptides of mammalian origin. For example, the liquid composition does not comprise any albumin or other serum proteins.

In particular embodiments, the liquid composition does not comprise animal components.

In particular embodiments, the liquid composition does not comprise serum.

In particular embodiments, the liquid composition does not comprise anti-microbial agents, such as antibiotics.

Present inventors found that the liquid composition as taught herein allows highly efficient cryopreservation (e.g. vitrification or freezing) of biological material with viability, proliferation and morphological endpoints similar to uncryopreserved control biological material.

Accordingly, a further aspect provides the use of the liquid composition as taught herein for cryopreservation of a biological material.

In particular embodiments, the cryopreservation of the biological material is performed by a freezing procedure such as a slow freezing procedure or a vitrification procedure such as multi-step vitrification or one-step vitrification.

The term "slow freezing or freezing procedure" or "SLF" as used herein refers to a process of cooling biological material to a temperature below 0° C., for example to a temperature of at least −80° C. or at least −196° C., wherein the biological material is cooled at a slow controlled rate—e.g. at a decrease of 0.1° C.-2° C. per minute. The controlled rate of cooling can be achieved by any device known in the art for such purposes, such as a rate-controlled freezer or a benchtop portable freezing container. The biological material is typically contacted with one or more cryoprotectants (e.g. 10% (v/v) DMSO in culture medium) to prevent mechanical—e.g. membranes disruptions due to ice crystals—and osmotic damages in the cell.

For example, a slow freezing procedure may comprise the following steps: immersing a biological material in a cryopreservation solution containing 10% dimethyl sulfoxide (DMSO) (e.g. CryoStor® CS10 (STEMCELL Technologies)) or in a 50% or 25% dilution of the liquid composition as taught herein, transferring the biological material to cryovials, storing the cryovials comprising the biological material overnight in a freezing container (e.g. Mr Frosty™ (Nalgene) device) in a −80° C. freezer and subsequently transferring the cryovials into liquid nitrogen.

The term "vitrification" as used herein refers to a process of cooling biological material, wherein the biological material is cooled to a temperature below 0° C., for example to a temperature at least −130° C., at a very fast cooling rate—e.g. from 2 000° C. to 20 000° C. per minute—until it reaches the final storing temperature. The biological material is typically contacted with one or more cryoprotectants (typically from 5 to 7.15 M) to prevent osmotic damage in the cell and inhibit the formation of ice in the cooling process. Vitrification procedures are known in the art and include multi-step and one-step vitrification procedures. Vitrification procedures typically comprise at least one step of dehydrating the biological material with an aqueous solution ("vitrification solution") containing permeating and/or non-permeating cryoprotectants. The biological material together with a quantity of vitrification solution is placed in a suitable cryocontainer and rapidly chilled by immersion in a cryogenic fluid, such as liquid nitrogen or its vapour. A well-balanced cooling rate and concentration of cryoprotectants allows the intracellular water to attain a solid, innocuous, glassy (vitreous) state rather than an orderly, damaging, crystalline ice state. Vitrification devices are known in the art and include, for instance, cryocontainers.

For example, a one-step vitrification procedure may comprise the following steps: contacting a biological material with the undiluted liquid composition for cryopreservation as taught herein and moving it in the composition to eliminate substantially all culture medium surrounding the biological material, harvesting the biological material in a smaller volume of the liquid composition as taught herein and loading it in a protective straw or cryovial. The straw or cryovial is sealed and directly plunged in liquid nitrogen. The period between transferring the biological material into the liquid composition as taught herein and plunging it into liquid nitrogen is at most 1 minute.

For example, a multi-step (equilibration) vitrification procedure may comprise the following steps: subsequently immersing the biological material in decreasing dilutions of the stock liquid composition for cryopreservation as taught herein (e.g. 3 minutes in a 1:16 dilution, 3 minutes in a 1:8 dilution, 3 minutes in a 1:4 dilution, 5 minutes in a 1:2 dilution), immersing the biological material in a smaller volume of the undiluted stock composition as taught herein in a protective straw or cryovial. The straw or cryovial is sealed and directly plunged in liquid nitrogen.

In particular embodiments the liquid composition as taught herein is used for cryopreservation of a biological material at a temperature of at least −80° C., at least −70° C., at least −80° C., at least −90° C., at least −100° C., at least −110° C., at least −120° C., at least −130° C., at least −140° C., at least −150° C., at least −160° C., at least −170° C., at least −180° C., at least −190° C. or at least −200° C.

In particular embodiments the liquid composition as taught herein is used for cryopreservation of a biological material for a period of at least 1, 2, 3, 4, 5, 6, 7, 8, 9, 10, 15 or 20 year(s).

Generally recommended cooling and warming rates for cryopreserving biological materials are [~20,000° C./min].

In particular embodiments, the cooling and/or warming rate of the vitrification method is [~1000° C./min]. The inventors have found that the compositions of the present invention provided strong ice crystal inhibiting properties in vitrification methods wherein cooling rates and/or warming rates are [~1000° C./min].

Likewise, a further aspect provides a method for preserving a biological material comprising the steps of:
providing a biological material;
contacting the biological material with the liquid composition (e.g. stock composition or dilution of the stock composition) as taught herein;
cooling and/or heating the biological material in the liquid composition as taught herein.

The term "contact" or "contacting" as used herein refers to bringing one or more first components (such as one or more molecules, biological entities, cells, or materials) together with one or more second components (such as one or more molecules, biological entities, cells, or materials) in such a manner that the first component(s) is/are directly exposed to (i.e. into direct contact with) the second component(s) and can—if capable thereof—bind or modulate the second component(s) or that the second component(s) can—if capable thereof—bind or modulate the first component(s). The term "contacting" may depending on the context be synonymous with "exposing", "incubating", "mixing", or the like.

In particular embodiments, the contacting of the biological material with the liquid composition as taught herein is achieved by immersing or plunging the biological material in a volume of the liquid composition, preferably wherein the volume of the liquid composition is sufficient to completely surround the biological material. The skilled person will understand that the volume of the liquid composition used depends on the type and the amount of biological material. For example, if the biological material is an embryo, 0.1 µl to 1 µl of the liquid composition may be sufficient.

In particular embodiments, the contacting the biological material with the liquid composition is performed in a container which is suitable for cryopreservation. Such containers are known in the art and include, for instance, a protective French straw or a cryovial.

In particular embodiments, the method comprises one or more pre-cooling equilibration steps, which involve a brief (30-600 sec, preferably 180-300 sec) contact with one or more (typically increasing) concentrations of the vitrification medium at a temperature between 15-37° C. Pre-cooling equilibration steps are typically included in multi-step cooling procedures, such as multi-step vitrification as described elsewhere herein.

In particular embodiments, the methods involve cooling the biological material. In further embodiments, the methods involve heating the biological material. In particular embodiments, the biological material is cooled to a temperature below freezing point and, after a given time period, heated to a temperature above freezing point.

In contrast to commonly used methods for preserving a biological material including a cooling step (e.g. vitrification) making use of several different compositions (i.e. consisting of different ingredients) for equilibrating the biological material prior to cooling to achieve satisfactory efficiency of the process, the liquid composition as taught herein allows for using the same stock solution (but in various dilutions) for equilibrating the biological material.

Accordingly, in particular embodiments, the method comprises contacting the biological material with at least one (such as one, two, three or four, preferably four) dilution of the liquid composition (e.g. stock composition) as taught herein before contacting the biological material with the undiluted liquid composition (e.g. stock composition) as taught herein, wherein said step is performed before cooling of the biological material. In more particular embodiments, the undiluted liquid stock composition comprises, consists essentially of or consists of 13.0-23.0% (v/v) of DMSO; 13.0-23.0% (v/v) of ethylene glycol, 9.0-31.0% (w/v) sucrose; 0.60-22.0% (w/v) dextran; 0.30-4.0% (w/v) of polyvinyl alcohol and up to 100% (v/v) of a diluent, preferably about 17.7% (v/v) DMSO, about 17.7% (v/v) ethylene glycol, about 22.7% (w/v) sucrose, about 0.88% dextran 1 (w/v), about 0.88% dextran 40 (w/v), about 0.88% dextran 70 (w/v), about 0.88% (w/v) polyvinyl alcohol and D-PBS up to 100% (v/v).

In particular embodiments, the at least one dilution of the liquid composition (e.g. stock composition) as taught herein is a 1:2, 1:3, 1:4, 1:5, 1:6, 1:7, 1:8, 1:9, 1:10, 1:11, 1:12, 1:13, 1:14, 1:15 and/or 1:16 dilution.

In particular embodiments, the method comprises subsequently contacting the biological material with two or more (such as two, three or four, preferably four) decreasing dilutions of the liquid composition (e.g. stock composition) as taught herein before contacting the biological material with the undiluted liquid composition (e.g. stock composition) as taught herein, wherein said step is performed before cooling of the biological material, preferably wherein the last dilution of the liquid composition with which the biological material is contacted before contacting the biological material with the undiluted liquid composition is a 1:2 dilution.

In particular embodiments, the method comprises contacting the biological material with a 1:16 dilution, a 1:8 dilution, a 1:4 dilution and a 1:2 dilution of the liquid composition (e.g. stock composition) as taught herein before contacting the biological material with said composition (e.g. stock composition), wherein said step is performed before cooling of the biological material, preferably wherein the undiluted liquid stock composition comprises, consists essentially of or consists of 13.0-23.0% (v/v) of DMSO; 13.0-23.0% (v/v) of ethylene glycol, 9.0-31.0% (w/v) sucrose; 0.60-22.0% (w/v) dextran; 0.30-4.0% (w/v) of polyvinyl alcohol and up to 100% (v/v) of a diluent, more preferably about 17.7% (v/v) DMSO, about 17.7% (v/v) ethylene glycol, about 22.7% (w/v) sucrose, about 0.88% dextran 1 (w/v), about 0.88% dextran 40 (w/v), about 0.88% dextran 70 (w/v), about 0.88% (w/v) polyvinyl alcohol and D-PBS up to 100% (v/v).

In particular embodiments, the method comprises contacting the biological material with
- a 1:16 dilution of the liquid composition (e.g. stock composition) as taught herein for at least 0.5 minute, at least 1 minute, at least 2 minutes, at least 3 minutes, at least 4 minutes or at least 3 minutes, preferably at least 3 minutes,
- a 1:8 dilution of the liquid composition (e.g. stock composition) as taught herein for at least 0.5 minute, at least 1 minute, at least 2 minutes, at least 3 minutes, at least 4 minutes or at least 3 minutes, preferably at least 3 minutes,
- a 1:4 dilution of the liquid composition (e.g. stock composition) as taught herein for at least 0.5 minute, at least 1 minute, at least 2 minutes, at least 3 minutes, at least 4 minutes or at least 3 minutes, preferably at least 3 minutes, and
- a 1:2 dilution of the liquid composition (e.g. stock composition) as taught herein for at least 0.5 minute, at least 1 minute, at least 2 minutes, at least 3 minutes, at least 4 minutes or at least 3 minutes, preferably at least 5 minutes, before contacting the biological material with said composition (e.g. stock composition), wherein said step is performed before cooling of the biological material.

In particular embodiments, each step of contacting the biological material with the 1:16 dilution of the liquid composition, the 1:8 dilution of the liquid composition, the 1:4 dilution of the liquid composition and the 1:2 dilution of the liquid composition is performed for a period from 0.5 to 10 minutes, from 1 to 6 minutes or from 3 to 5 minutes, preferably from 3 to 5 minutes.

In particular embodiments, the cooling of the biological material is performed within 3 minutes, 2 minutes or 1 minute, preferably within 1 minute, from contacting the biological material with the liquid composition (i.e. diluted or undiluted) as taught herein.

In particular embodiments, said cooling comprises decreasing the temperature of the biological material to a temperature of at least −70° C., at least −80° C., at least −90° C., at least −100° C., at least −110° C., at least −120° C., at least −130° C., at least −140° C., at least −150° C., at least −160° C., at least −170° C., at least −180° C., at least −190° C. or at least −200° C. This may be achieved by any methods known in the art such as by freezing procedures (e.g. slow-freezing) or vitrification.

In particular embodiments, said cooling is performed by a slow-freezing procedure. In more particular embodiments, if the cooling is performed by a slow-freezing procedure, the liquid composition is a dilution, preferably a 1:2 or 1:4 dilution, more preferably a 1:4 dilution; of the liquid stock composition which comprises, consists essentially of or consists of 13.0-23.0% (v/v) of DMSO; 13.0-23.0% (v/v) of ethylene glycol, 9.0-31.0% (w/v) sucrose; 0.60-22.0% (w/v) dextran; 0.30-4.0% (w/v) of polyvinyl alcohol and up to 100% (v/v) of a diluent, preferably about 17.7% (v/v) DMSO, about 17.7% (v/v) ethylene glycol, about 22.7% (w/v) sucrose, about 0.88% (w/v) dextran 1 (w/v), about 0.88% dextran 40 (w/v), about 0.88% (w/v) dextran 70 (w/v), about 0.88% (w/v) polyvinyl alcohol and D-PBS up to 100% (v/v).

In particular embodiments, said method comprises a one-step vitrification of the biological material. In particular embodiments, if the method comprises a one-step vitrification of the biological material, the biological material is only contacted with the undiluted liquid stock composition which comprises, consists essentially of or consists of 13.0-23.0% (v/v) of DMSO; 13.0-23.0% (v/v) of ethylene glycol, 9.0-31.0% (w/v) sucrose; 0.60-22.0% (w/v) dextran; 0.30-4.0% (w/v) of polyvinyl alcohol and up to 100% (v/v) of a diluent, preferably about 17.7% (v/v) DMSO, about 17.7% (v/v) ethylene glycol, about 22.7% (w/v) sucrose, about 0.88% dextran 1 (w/v), about 0.88% dextran 40 (w/v), about 0.88% dextran 70 (w/v), about 0.88% (w/v) polyvinyl alcohol and D-PBS up to 100% (v/v).

In particular embodiments, said method comprises a multi-step vitrification of the biological material. The multi-step vitrification may comprise before cooling of the biological material one or more equilibration step(s), wherein the biological material is contacted with at least one (such as one, two, three or four, preferably four) dilution of the liquid composition (e.g. stock composition) as taught herein before contacting the biological material with the undiluted liquid composition (e.g. stock composition) as taught herein, as described elsewhere herein. Preferably, the undiluted liquid stock composition comprises, consists essentially of or consists of 13.0-23.0% (v/v) of DMSO; 13.0-23.0% (v/v) of ethylene glycol, 9.0-31.0% (w/v) sucrose; 0.60-22.0% (w/v) dextran; 0.30-4.0% (w/v) of polyvinyl alcohol and up to 100% (v/v) of a diluent, more preferably about 17.7% (v/v) DMSO, about 17.7% (v/v) ethylene glycol, about 22.7% (w/v) sucrose, about 0.88% dextran 1 (w/v), about 0.88% dextran 40 (w/v), about 0.88% dextran 70 (w/v), about 0.88% (w/v) polyvinyl alcohol and D-PBS up to 100% (v/v).

In particular embodiments, the step of contacting the biological material with the liquid composition as taught herein is performed at a temperature from 15° C. to 40° C., from 15° C. to 37° C., from 20° C. to 37° C. or from 20° C. to 30° C. For example, at about 20° C.

In particular embodiments, the temperature of the biological material before cooling of the biological material is from 15° C. to 40° C., from 15° C. to 37° C., from 20° C. to 37° C. or from 20° C. to 30° C. For example, at about 20° C.

In particular embodiments, said method comprises storing the biological material for a period of at least 1 minute, at least 1 hour or at least 1 day, wherein said storing is performed after cooling of the biological material, and wherein said storing is performed at a temperature of at least −70° C., at least −80° C., at least −90° C., at least −100° C., at least −110° C., at least −120° C., at least −130° C., at least −140° C., at least −150° C., at least −160° C., at least −170° C., at least −180° C., at least −190° C. or at least −200° C., preferably at least −100° C., more preferably at least −190° C.

In particular embodiments, said method comprises heating the biological material after the cooling of the biological material. Heating of the biological material may be performed by any methods known in the art for heating or warming a cooled, frozen or vitrified biological material.

In particular embodiments, the heating comprises directly contacting the cooled, preferably vitrified, biological material, with a culture medium for culturing said biological material wherein said culture medium has a temperature of at least 25° C., at least 26° C., at least 27° C., at least 28° C., at least 29° C., at least 30° C., at least 31° C., at least 32° C., at least 33° C., at least 34° C., at least 35° C., at least 36° C. or at least 37° C., for example 37° C. For example, pre-warmed (e.g. to 37° C.) culture medium may be directly added to the cooled, preferably vitrified, biological material. Subsequently, the liquid composition for cryopreservation as taught herein may be substantially separated from the thawed biological material, for example by centrifugation. Subsequently, the biological material may be contacted with fresh culture medium and put into culture.

The term "growth medium" or "culture medium" as used herein refers to a solid, liquid or semi-solid designed to support the growth of cells or tissue. Growth medium typically comprises macronutrients (e.g. nitrogen, phosphorus, potassium, calcium, magnesium or sulfur), micronutrients (e.g. iron, manganese, zinc, boron, copper, molybdenum), vitamins, amino acids, one or more sugars (e.g. glucose), inorganic salts and/or proteins (e.g. transferrin). Growth media are well known in the art and may vary dependent on the type of cell or tissue cultured, as well as on the purpose of the culture (e.g. differentiation, expansion or maintenance). Non-limiting examples of growth media include Eagle's Minimum Essential Medium (MEM), Dulbecco's Modified Eagle's Medium (DMEM), alpha modified Minimum Essential Medium (alpha-MEM), Basal Medium Essential (BME), Iscove's Modified Dulbecco's Medium (IMDM), BGJb medium, F-12 Nutrient Mixture (Ham), Liebovitz L-15, DMEM/F-12, Essential Modified Eagle's Medium (EMEM), RPMI-1640, Medium 199, Waymouth's MB 752/1 or Williams Medium E, Mesenchymal Stem Cell Basal Medium and modifications and/or combinations thereof.

Present inventors found that the liquid composition as described herein is especially beneficial in slow-rate warming (e.g. including air-warming or warming in a water bath (for instance at a temperature of 37° C.)) of biological material, such as mouse embryos, compared to a control cryopreservation solution.

In particular embodiments, the heating of the biological material comprises warming the cooled, preferably vitrified, biological material, by exposing the cooled, preferably vitrified, biological material, to a water bath with a temperature from 15° C. to 37° C. (for instance, at a temperature of about 37° C.) for a period of at most 10 seconds, before contacting the biological material with the culture medium for culturing said biological material, wherein said culture medium has a temperature of at least 25° C., at least 26° C., at least 27° C., at least 28° C., at least 29° C., at least 30° C., at least 31° C., at least 32° C., at least 33° C., at least 34° C., at least 35° C., at least 36° C. or at least 37° C., for example 37° C.

In particular embodiments, the heating of the biological material comprises air-warming the cooled, preferably vitrified, biological material, by exposing the cooled, preferably vitrified, biological material, to open air with a temperature from 15° C. to 30° C. for a period of at most 10 seconds, before contacting the biological material with the culture medium for culturing said biological material, wherein said culture medium has a temperature of at least 25° C., at least 26° C., at least 27° C., at least 28° C., at least 29° C., at least 30° C., at least 31° C., at least 32° C., at least 33° C., at least 34° C., at least 35° C., at least 36° C. or at least 37° C., for example 37° C.

In particular embodiments, the heating of the biological material comprises contacting the biological material with at least one hyperosmotic solution composed of a non-penetrating cryoprotectant such as sucrose or trehalose, before contacting the biological material with the culture medium for culturing said biological material with a temperature of at least 25° C.

In particular embodiments, the heating of the biological material comprises contacting the biological material with at least one sucrose solution before contacting the biological material with the culture medium for culturing said biological material with a temperature of at least 25° C., wherein the at least one sucrose solution is a 1 M, a 0.75 M, a 0.6 M, a 0.5 M, a 0.25 M, a 0.2 M and/or a 0.1 M sucrose solution, preferably in a balanced salt solution, more preferably in PBS, even more preferably in D-PBS.

In particular embodiments, the heating of the biological material comprises subsequently contacting the biological material with a 1 M, a 0.75 M, a 0.5 M and a 0.25 M sucrose solution before contacting the biological material with the culture medium for culturing said biological material with a temperature of at least 25° C.

In particular embodiments, the methods as taught herein allow that the biological material remains viable after it is heated (e.g. warmed or thawed).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as follows in the spirit and broad scope of the appended claims.

The following examples are provided to better illustrate particular embodiments, and they should not be considered limiting the application. The application is limited only by the claims.

EXAMPLES

Example 1. The Compositions of Present Invention Allow to Successfully Cryopreserve Cells, Gametes and Embryos Materials and Methods Cryopreservation Solution (CDCS) Composition The Chemically Defined Cryopreservation Solution (CDCS) is composed as indicated in table 1 for its reference stock concentration (1× concentrated). According to protocols, this core solution can be used undiluted or diluted to address peculiar methodological/cryobiological requirements. Quantities of each of CDCS components in the undiluted stock can vary relatively to each other within the ranges indicated in table 1 without significantly altering conditioning or cryoprotective properties.

TABLE 1

Composition of stock CDCS solution (1x concentrated)

| Component | Final composition | preferred relative ranges |
|---|---|---|
| D-PBS or osmotically and physiologically equivalent solution | Diluent | Diluent |
| Dimethyl Sulfoxyde (DMSO) | 17.7% v/v | 13.3 to 22.1% v/v |
| Ethylene Glycol (EG) | 17.7% v/v | 13.3 to 22.1% v/v |
| Sucrose (SUC) | 22.7% w/v | 9.1 to 30.3% w/v |
| Dextran 1 (D1) | 0.88% w/v | 0.2 to 8.8% w/v |
| Dextran 40 (D40) | 0.88% w/v | 0.2 to 8.8% w/v |
| Dextran 70 (D70) | 0.88% w/v | 0.2 to 8.8% w/v |
| Polyvinyl alcohol (PVA) | 0.88% w/v | 0.3 to 3.5% w/v |

Reference Vitrification Solution (VSE) Composition

A commonly used reference embryo vitrification solution (VSE, Vanderzwalmen et al., 2013) has been used as a comparison point for various CDCS properties. Table 2 compares CDCS and VSE compositions. This reference solution is very similar to commercial solutions commonly used in ART (e.g. FertiVit™ from Fertipro).

TABLE 2

Comparison of stock CDCS solution (1x concentrated) and VSE

| Component | CDCS (1x), final composition | VSE, final composition |
|---|---|---|
| D-PBS or osmotically and physiologically equivalent solution | Diluent | Diluent |
| Dimethyl Sulfoxyde (DMSO) | 17.7% v/v | 20% v/v |
| Ethylene Glycol (EG) | 17.7% v/v | 20% v/v |
| Sucrose (SUC) | 22.7% w/v | 17.1% w/v |
| Dextran 1 (D1) | 0.88% w/v | — |
| Dextran 40 (D40) | 0.88% w/v | — |
| Dextran 70 (D70) | 0.88% w/v | — |
| Polyvinyl alcohol (PVA) | 0.88% w/v | — |
| Ficoll 400 | — | 1% w/v |
| Fetal Calf Serum (FCS) | — | 10% v/v |
| Streptomycin sulfate | — | 0.005% w/v |
| Kanamycin monosulfate | — | 0.01% w/v |

Physical Testing of the Vitrification Ability of CDCS

The vitrification ability of undiluted CDCS (i.e. its solidification without crystal formation) upon cooling and the absence or crystal formation upon subsequent warming has been assessed using a physical test. VSE, CDCS$^{(-)}$ (a solution closely related to CDCS but lacking PVA, which had been developed by us as a less efficient precursor) and CDCS have been aspirated with a syringe in 250 µl semen french straws (Minitube ref 13407/0010) which were subsequently closed with a plug at their lower end. The straws were plunged and stirred in liquid nitrogen (LN2) and then warmed in a 37° C. waterbath. The vitrification/crystallization state upon cooling and subsequent warming was assessed by visual examination: a solution submitted to cooling or warming across its glass transition temperature remains clear and transparent upon vitrification while crystallization induces a white/milky aspect.

Stability Assays of CDCS

CDCS has been submitted to stability assays when kept (i) at 4° C., (ii) at room temperature (22+/−4° C.), (iii) during two weeks at room temperature followed by storage at 4° C., (iv) at 37° C. and (v) during two weeks at 37° C. followed by storage at 4° C. Aliquots have been tested one day after manufacture (D1) and subsequently at various time points encompassing day 7 (D7), D14, and after one (M1), two (M2), three (M3) and six (M6) months. Recorded endpoints were (i) normal/abnormal aspect after visual examination (turbidity, precipitates . . . ) and (ii) efficiency of one-step vitrification of murine embryo as described hereafter (FVB/N strain).

Cryopreservation of Embryos, Oocytes and Cells with CDCS

Mouse Embryos

Production and Culture

C57BL6/JRj inbred (Janvier Labs, France) mice were used in this example. Fertilized oocytes were provided by the Central Mouse Facility of the University of Liege. Zygotes with two pronuclei and a normal-looking cytoplasm were kept for further use. If applicable, they were cultured in 50 µl drops of M16 medium under mineral oil, in water-saturated atmosphere at 37° C. under 5% $CO_2$ until treatment. Embryos at the 2-cell stage either have been submitted to vitrification or were kept as non-cryopreserved controls.

Vitrification

Vitrification of embryos was performed using a one-step method using either the above-disclosed CDCS or VSE. Briefly, embryos are harvested from their culture medium and transferred into a 500 µl CDCS or VSE drop. They are moved several times into the vitrification solution to eliminate their gangue of culture medium. Then, they are harvested in 0.3 to 1 µl of the vitrification medium onto a carrier (VitriVet™, Vitrimed, Bregenz, Austria), which is inserted into a protective straw. The straw is sealed and directly plunged and stirred in LN2. From transferring the embryos into CDCS or VSE to plunging them into LN2 takes no more than 60 seconds.

Warming

Warming was performed at least 24 hours after cooling. The VitriVet™ carrier was extracted from its protective straw while still hanging into LN2. The VitriVet™ gutter is either (i) gently agitated in open air during 10 seconds, and subsequently immersed into warm (37° C.) culture medium, or else (ii) directly immersed into the culture medium without air-warming step.

Culture and Endpoints

Recorded endpoints were early survival and development to the blastocyst stage. Early survival was assessed by evaluating morphology of the zona pellucida and blastomeres one hour after warming. Development to blastocyst stage was observed and recorded at day 5 of development (D5).

Mouse Metaphase 2 (MII) Oocytes

FVB/NRj and C57BL6/JRj inbred (Janvier Labs, France) mice have been used in this study. MII oocytes have been harvested, submitted to the same vitrification and warming as embryos but only with CDCS and direct warming into the culture medium. They were subsequently submitted to In Vitro Fertilization (IVF) with frozen sperm. Fertilized oocytes were put in culture for 48 hours to 5 days. Two-cell stages embryos obtained after 48 hours were either allowed to continue their development to the blastocyst stage (D5) or transferred into the oviduct of B6CBAF1/JRj (Janvier Labs, France) pseudo-pregnant mothers using standard procedures (Nagy A.; Vintersten K.; Behringer R. 2003). Successful fertilization, development to the 2-cell and blastocyst stages and birth rates after transfer were recorded as endpoints.

Human Embryos and MII Oocytes

Vitrification of aneuploid blastocyst stage embryos and of human MII oocytes have been performed with compliance to current legal and ethics regulations. CDCS has been used in various dilutions in D-PBS and in undiluted form following a multi-step equilibration protocol before cooling. Upon warming, multi-step equilibration procedures in SUC solutions were applied before culture.

Blastocysts

Twenty aneuploid blastocysts previously vitrified and warmed using a classical procedure were subsequently re-vitrified with CDCS using the VitriSafe® closed carrier system (VitriMed, Austria). Before cooling, embryos were equilibrated in various dilutions (in D-PBS) of CDCS and finally in non-diluted CDCS. Briefly, blastocysts were immersed for 5 minutes in 50 µl of 25% (v/v) CDCS followed by 4 to 6 minutes in 50 µl of 50% (v/v) CDCS. Subsequently, blastocysts were transferred in a 100 µl undiluted CDCS drop for approximately 60 seconds, which include the time needed to load the embryos on the carrier within a 0.3 µl to 1.0 µl CDCS microdroplet, insert in a protective straw, seal it and plunge it into LN2.

For warming, the VitriSafe® carriers have been removed using an extractor tool. The tips of the carriers were immersed in 1 ml of 1 M SUC solution (in D-PBS) at room temperature. After 30 seconds, the blastocysts were transferred in 0.75 M SUC for an additional 30 seconds, followed by 1 minute in 0.5 M SUC and 2 minutes in 0.25 M SUC. Blastocysts were finally transferred into the appropriate culture medium.

Morphological and "health" status of treated blastocysts were recorded immediately after warming and after 18 hours in culture.

MII Oocytes

Ten MII oocytes underwent a similar vitrification protocol as for blastocysts but with slight modifications of the pre-cooling and warming equilibration steps. Before cooling, oocytes were sequentially immersed in 50 µl droplets of diluted CDCS (in D-PBS) as follows: 3 minutes in 6.25% (v/v) CDCS, 3 minutes in 12.5%, 3 minutes in 25% (v/v) and 5 minutes in 50%. Subsequently, they were transferred in a 100 µl undiluted CDCS drop for approximately 60 seconds before plunging in LN2 the same way as described here above for blastocysts.

For warming, the tip of the carrier was immersed in 1 ml of 1 M SUC and the embryos were transferred in that solution for 1 minute, followed by 0.5 M SUC for 3 minutes, 0.25 M SUC for 2 minutes and 0.125 M SUC for 2 minutes. Oocytes were finally transferred into the appropriate culture medium. Morphological and "health" status of treated oocytes were recorded immediately after warming and after 18 hours in culture.

Equine Mesenchymal Stem Cells

Isolation and Culture

Mesenchymal stem cells isolated from equine cadaver (EC-MSCs, gift from Prof N. Antoine, U. Liege) were maintained in DMEM+GlutaMAX (Gibco) supplemented with 10% foetal bovine serum (Gibco) and 1% Pen/Strep (Gibco) at 37° C. with 5% CO2. At a confluency of 70-80%, cells were passaged using 0.05% Trypsin-EDTA (Gibco).

Vitrification and Warming

For vitrification in a one-step format, cells were detached and aliquots of $10^6$ cells were prepared. After centrifugation, cell pellets were resuspended in 220 µl of CDCS (previously equilibrated at room temperature), transferred into 1.8 ml cryovials (Nunc) and plunged into LN2 while stirring, respecting a time frame of 30 s between the first contact of the cells with CDCS and immersion in LN2. Cells were stored in a LN2 tank for at least 24 h. For each experiment, non-treated cell aliquots were seeded and analysed, referred to as non-vitrified controls.

Vitrified cells were subsequently warmed by taking the cryovials out of LN2, bringing and keeping their lower part in a 37° C. water bath while directly adding 1 ml of pre-warmed (37° C.) culture medium and gently pipetting up and down. Cell suspensions were then transferred into conical tubes containing 3 ml of complete culture medium, centrifuged, resuspended in fresh medium and seeded in 6-well plates.

Slow Freezing (SLF) and Thawing

For SLF, cells were detached and equally distributed into four groups. After centrifugation, cell pellets were resuspended in either culture medium (non-cryopreserved control), 10% DMSO in the culture medium (Ref) or in a 25% or 50% dilution of CDCS in D-PBS at a concentration of $10^6$ cells/ml. Aliquots of 1 ml ($10^6$ cells) were then distributed in 1.8 ml cryovials (Nunc) which were put overnight in Mr Frosty™ (Nalgene) devices in a −80° C. freezer before storage in LN2. Cells were stored in the LN2 tank for at least 4 h. Non-treated cells were seeded and analysed, referred to as non-cryopreserved controls.

Frozen cells were subsequently warmed by taking the cryovials out of LN2, bringing and keeping their lower part in a 37° C. water bath. Directly after thawing, 1 ml of culture medium was added and mixed by pipetting up and down. Cell suspensions were then transferred into conical tubes containing 3 ml of culture medium. Each sample was adjusted to 10 ml by adding culture medium, centrifuged, resuspended in 1 ml fresh medium and seeded in 6-well plates.

Endpoints Recording

Cell viability was assessed 24 h post thawing or post-passaging (for non-vitrified controls) on detached cells after trypsinization using a trypan blue exclusion assay (TC20 Cell Counter, Bio-Rad).

Confluency was evaluated at the indicated time points by analysing 5 random images per well using the DP22 microscope camera along with the CKX-CCSW Confluency Checker Software (Olympus).

Human Induced Pluripotent Stem Cells (hiPSCs)

Origin of the Cells and Culture

A hiPSC line (dKIPs, gift from Prof. Dr F. Edenhofer, U. Bonn) has been submitted to slow freezing using CDCS.

They were cultivated in vitronectin-coated 6-well cell culture plates, in Essential 8™ Flex medium (Gibco) supplemented 0.5% Pen/Strep (Gibco) at 37° C. with 5% CO2.
Slow Freezing (SLF)

For SLF, culture plates were gently rinsed with D-PBS, cells were detached as aggregates from the wells using ReLeSR™ (StemCell Technologies), suspended in Essential 8™-Flex medium, pooled, and equally distributed into three groups. One group did not receive any treatment and was directly put back in culture (non-cryopreserved control). After centrifugation, cell pellets were resuspended in either CryoStor® CS10 (STEMCELL Technologies) or in a 50% dilution of CDCS in D-PBS at a concentration corresponding to 1 culture well/ml. Aliquots of 1 ml (equivalent to the amount of cells in 1 well) were then distributed in 1.8 ml cryovials (Nunc) which were put overnight in Mr Frosty™ (Nalgene) devices in a −80° C. freezer before storage in LN2. Cells were stored in the LN2 tank for at least 4 h.
Thawing Frozen cells were subsequently warmed by taking the cryovials out of LN2, bringing and keeping their lower part in a 37° C. water bath. Directly after thawing, 1 ml of Essential 8™ Flex culture medium was added and mixed by very gently pipetting up and down. Cell suspensions were then transferred into conical tubes containing 3 ml of culture medium. Each sample was adjusted to 10 ml by adding culture medium, centrifuged, resuspended in 1 ml fresh medium. Each sample was seeded in four wells of vitronectin-coated 6-well plates.
Endpoints Recording Cell viability was assessed 24 h post thawing (or post-passaging for non-frozen controls) on detached cells (Stem-Pro® Accutase® Cell Dissociation Reagent, Gibco) using a trypan blue exclusion assay (TC20 Cell Counter, Bio-Rad).

Confluency was evaluated at the indicated time points by analysing 5 random images per well using the DP22 microscope camera along with the CKX-CCSW Confluency Checker Software (Olympus).
Results
Physical Testing of the Vitrification Ability of CDCS As shown in table 3, CDCS does not undergo any crystallization upon cooling in LN2 nor upon warming in a 37° C. waterbath. In the same standardized conditions, VSE undergoes crystallization upon cooling in half of the samples, while all CDCS$^{(-)}$ (precursor of CDCS without PVA) samples undergo crystallization upon warming. In conclusion, both the reference VSE solution and CDCS$^{(-)}$ (CDCS devoid of PVA) do not allow consistent vitrification, and allow fast crystal formation upon cooling (VSE) or warming (CDCS$^{(-)}$) in the proposed system with relatively high thermal inertia. This fast crystallization of VSE and CDCS$^{(-)}$ is expected to be deleterious to the cells it may contain. CDSC thus is demonstrated to be a strong ice crystal inhibiting solution, even stronger than a renowned vitrification composition (VSE, whose composition is very similar to commercial solutions used in Medically Assisted Procreation (MAP)), and in conditions causing cooling and warming rates slower than generally recommended.

TABLE 3

Physical vitrification tests of VSE, CDCS$^{(-)}$ and CDCS

| Vitrification solution | Straw ID | Cooling | Warming |
| --- | --- | --- | --- |
| VSE | VSE1 | V | V |
|  | VSE2 | C | C |
|  | VSE3 | C | C |
|  | VSE4 | V | V |
| CDCS$^{(-)}$ | CDCS$^{(-)}$1 | V | C |
|  | CDCS$^{(-)}$2 | V | C |
|  | CDCS$^{(-)}$3 | V | C |
|  | CDCS$^{(-)}$4 | V | C |
| CDCS | CDCS1 | V | V |
|  | CDCS2 | V | V |
|  | CDCS3 | V | V |
|  | CDCS4 | V | V |

This table reports the results of a standardized physical vitrification test. Three vitrification solutions (VSE, CDCS$^{(-)}$ and CDCS) were aspirated and sealed in 250 μl french straw, cooled in LN2 and subsequently warmed in a 37° C. waterbath. The vitrified or crystallized states were assessed upon cooling and warming by visual examination.
"V" stands for vitrification and "C" for crystallization.

Stability Assays of CDCS

CDCS has been submitted to stability assays when stored for several weeks at 4° C., room temperature, 37° C. and combinations of room temperature or 37° C. with further storage at 4° C. As shown in table 4, and in spite of the absence of any antimicrobial agent, no noticeable alteration of CDCS was observed over time whatever the storage conditions, as assessed by visual inspection of the solution (no turbidity nor precipitates) or its effectiveness in vitrifying embryos.

As a conclusion, the properties of the CDCS composition are remarkably stable along time, even in unfavourable temperature conditions and in spite of the absence of any antimicrobial agent. Indeed, storage at 4° C. as well as 37° C. (and also in intermediate and mixed temperature conditions) for as much as 6 months does not alter its optical/physical aspect nor its high efficiency in vitrifying murine embryos.

TABLE 4

Stability tests of CDCS in various storage conditions

| Time point | # Embryos | # Survival | % Survival | # Blastocysts | % Blastocysts | Visual inspection |
| --- | --- | --- | --- | --- | --- | --- |
| Storage at 4° C. | | | | | | |
| D1 | 21 | 21 | 100% | 14 | 67% | OK |
| D7 | 21 | 21 | 100% | 14 | 67% | OK |
| D14 | 19 | 19 | 100% | 19 | 100% | OK |
| M1 | 20 | 20 | 100% | 19 | 95% | OK |
| M2 | 21 | 21 | 100% | 19 | 90% | OK |
| M3 | 20 | 20 | 100% | 18 | 90% | OK |
| M6 | 20 | 20 | 100% | 14 | 70% | OK |
| Storage at room temperature | | | | | | |
| D7 | 21 | 21 | 100% | 13 | 62% | OK |
| D14 | 20 | 20 | 100% | 12 | 60% | OK |

TABLE 4-continued

Stability tests of CDCS in various storage conditions

| Time point | # Embryos | # Survival | % Survival | # Blastocysts | % Blastocysts | Visual inspection |
|---|---|---|---|---|---|---|
| M1 | 21 | 21 | 100% | 16 | 76% | OK |
| M3 | 21 | 21 | 100% | 14 | 67% | OK |
| M6 | 20 | 20 | 100% | 17 | 85% | OK |
| Storage at room temperature (14D) then 4° C. | | | | | | |
| D14 | 21 | 21 | 100% | 13 | 62% | OK |
| M1 | 21 | 21 | 100% | 18 | 86% | OK |
| M3 | 21 | 21 | 100% | 13 | 62% | OK |
| M6 | 17 | 17 | 100% | 14 | 82% | OK |
| Storage at 37° C. | | | | | | |
| D7 | 21 | 21 | 100% | 12 | 57% | OK |
| D14 | 21 | 20 | 95% | 14 | 70% | OK |
| M1 | 20 | 20 | 100% | 19 | 95% | OK |
| M2 | 21 | 21 | 100% | 16 | 76% | OK |
| M3 | 18 | 18 | 100% | 15 | 83% | OK |
| M6 | 20 | 20 | 100% | 20 | 100% | OK |
| Storage at 37° C. (14D) then 4° C. | | | | | | |
| D14 | 21 | 21 | 100% | 17 | 81% | OK |
| M1 | 20 | 20 | 100% | 20 | 100% | OK |
| M3 | 12 | 12 | 100% | 11 | 92% | OK |
| M6 | 21 | 21 | 100% | 20 | 95% | OK |

This table shows the results of stability tests performed on aliquots of CDCS in various storage conditions (4° C., room temperature, room temperature during 14 days followed by storage at 4° C., 37° C. and 37° C. during 14 days followed by storage at 4° C.). Time points for records were 7 days (D7), 14 days (D14), 1, 2, 3 or 6 months (M1, M2, M3, M6) after manufacturing of the solution. After visual inspection of the aliquots assessing normal aspect, it has been used as a vitrification solution for one-step vitrification of murine FVB/N embryos at the 2-cell stage. For each endpoint, the number of vitrified embryos, their immediate survival after warming and their development to the blastocyst stage have been recorded.

Cryopreservation of Embryos, MH Oocytes and Cells with CDCS

Mouse Embryos

Two-cell stage mouse embryos of C57BL6/JRj strain have been submitted to two vitrification/warming protocols using either the reference VSE vitrification solution or undiluted CDCS. Briefly, cooling was the same (one-step) for both protocols, but warming was different. Warming was either fast-rate by directly plunging the vitrified droplet containing the embryos in warmed culture medium, or slower-rate due to a first warming step into open air during 10 seconds before immersion into the medium (see M&M). As shown in table 5, upon slow-rate warming (air), early embryo survival was better with CDCS than with VSE (p=0.026).

TABLE 5

Vitrification and fast/slow-rate warming of mouse embryos with CDCS

| Treatment/session | # Embryos | # Survival | % Survival | # Blastocysts | % Blastocysts |
|---|---|---|---|---|---|
| CDCSmed/1 | 19 | 13 | 68% | 8 | 42% |
| CDCSmed/2 | 36 | 34 | 94% | 28 | 78% |
| CDCSmed/Total | 55 | 47 | 85% | 36 | 65% |
| CDCSair/1 | 19 | 18 | 95% | 12 | 63% |
| CDCSair/2 | 36 | 32 | 89% | 22 | 61% |
| CDCSair/Total | 55 | 50[a] | 91% | 34 | 62% |
| VSEmed/1 | 20 | 13 | 65% | 5 | 25% |
| VSEmed/2 | 36 | 32 | 89% | 25 | 69% |
| VSEmed/Total | 56 | 45 | 80% | 30 | 54% |
| VSEair/1 | 19 | 11 | 58% | 6 | 32% |
| VSEair/2 | 37 | 31 | 84% | 26 | 70% |
| VSEair/Total | 56 | 42[b] | 75% | 32 | 57% |
| Control/1 | 16 | 16 | 100% | 11 | 69% |
| Control/2 | 24 | 24 | 100% | 23 | 96% |
| Control/Total | 40 | 40 | 100% | 34 | 85% |

This table shows the results of C57BL6/JRj mouse 2-cell stage embryos vitrification and warming. Along with non-cryopreserved controls, two separate experiments were conducted (sessions 1 and 2). CDCS was compared to VSE in one step vitrification protocols followed by warming either by direct immersion of the embryo into the culture medium (med) or by slower-rate warming into the air followed by immersion in the medium (air). The numbers of embryos submitted to the tests are indicated (# Embryos) along with those surviving the treatment (# Survival), developing to the blastocyst stage at D5 (# Blastocysts). When relevant, survival and development values were affected a superscript, compared to each other using a Chi square test (1 df) and corresponding P values were calculated: ab: 0.026.

Mouse MII Oocytes

Mouse of C57BL6/JRj and FVB/NRj strains have been submitted to one-step vitrification with undiluted CDCS. They were subsequently fertilized in vitro with frozen sperm and either allowed to develop in vitro to the blastocyst stage or transferred into pseudo-pregnant mothers to monitor their development in vivo (endpoint=birth of live newborns). As shown in table 6, vitrification of oocytes with CDCS allows efficient IVF as well as in vitro and in vivo development of resulting embryos at rates similar to what is observed with usual vitrification protocols (F. J. Ectors, personal communication).

TABLE 6

Development of embryos produced after IVF of oocytes vitrified with CDCS

| Treatment/ strain | Oocyte s # | Zygotes # | Zygotes % | 2 cell # | 2 cell % | Blastocysts # start | Blastocysts # | Blastocysts % | Newborns # transf | Newborns # | Newborns % |
|---|---|---|---|---|---|---|---|---|---|---|---|
| C57BL6/JRj | 382 | 362$^a$ | 95% | 191$^c$ | 50% | 105 | 85$^e$ | 81% | 50 | 29$^g$ | 58% |
| NV control | 466 | 447$^b$ | 96% | 310$^d$ | 67% | 132 | 102$^f$ | 77% | 65 | 32$^h$ | 49% |
| FVB/NRj | 414 | 337$^i$ | 81% | 230$^k$ | 56% | 124 | 69$^m$ | 56% | 80 | 29$^o$ | 36% |
| NV control | 514 | 501$^j$ | 97% | 400$^l$ | 78% | 185 | 163$^n$ | 88% | 65 | 31$^p$ | 47% |

This table shows the results of C57BL6/JRj and FVB/NRj development of embryos produced by IVF of mouse oocyte one-step-vitrified with CDCS. Non-vitrified (NV) controls were produced the same way with fresh, non-vitrified oocytes. The numbers of oocytes submitted to the tests are indicated (# Oocytes) along with the resulting zygotes (# Zygotes) and 2-cell stage embryos (# 2 cell). Some 2-cell stage embryos were maintained in culture (# start.) to evaluate development to the blastocyst stage (# Blastocysts), or were transferred (# transf.) to evaluate the number of resulting newborns (# newborns). All corresponding percentages relative to the starting number of oocytes are indicated. Values of development after oocytes vitrification were compared to NV controls, and were affected a superscript, compared to each other using a Chi square test (1 df) and corresponding P values were calculated: ab: 0.423; cd: $1.121 \times 10^{-6}$; ef: 0.490; gh: 0.350; ij: $1.987 \times 10^{-16}$; kl: $5.153 \times 10^{-13}$; mn: $1.002 \times 10^{-10}$; op: 0.164.

Human Blastocysts

As shown in table 7, diluted and undiluted CDCS aliquots have been used in a multi-step procedure to vitrify aneuploid blastocysts. Starting from 20 embryos, 18 and 17 appeared healthy and intact directly after warming and after 18 hours culture, respectively.

TABLE 7

Vitrification of human aneuploid blastocysts with CDCS

Protocol (human D5 aneuploid blastocysts)

| Cooling | | | | |
|---|---|---|---|---|
| CDCS in D-PBS (%) | | | 25 | 50 |
| Exposure time (min) | | | 4 to 5 | 4 |
| Warming | | | | |
| SUC in HTF/HSA (8/2; M) | 1 | 0.75 | 0.5 | 0.25 |
| Exposure time (min) | 0.5 | 0.5 | 1 | 2 |

Results (human D5 aneuploid blastocysts)

| | Survival post-warming at time | |
|---|---|---|
| Total number treated | t = 0 | t = 18 hours |
| 20 | 18 intact | 17 intact |

This table shows the applied cooling protocol with CDCS dilutions (upper frame), and warming protocol with SUC. Dilutions of CDCS are expressed in % (v/v) and SUC content as a molarity (M). HTF is a culture medium for embryos, HSA stands for Human Serum Albumin. Blastocysts survival/integrity directly after warming and after 18 hours culture is shown in the lower frame.

Human MII Oocytes

As shown in table 8, diluted and undiluted CDCS aliquots have been used in a multi-step procedure to vitrify human MII oocytes. All of the 10 oocytes submitted to the study appeared healthy and intact directly after warming and after 18 hours culture, respectively.

TABLE 8

Vitrification of human MII oocytes with CDCS

Protocol (human MII oocytes)

| Cooling | | | | | |
|---|---|---|---|---|---|
| CDCS in D-PBS (%) | 6.25 | 12.5 | 25 | 50 | 100 |
| Exposure time (min) | 3 | 3 | 3 | 5 | 1 |
| Warming | | | | | |
| SUC in HTF/HSA (8/2; M) | | 1 | 0.5 | 0.25 | 0.125 |
| Exposure time (min) | | 1 | 3 | 2 | 2 |

Results (human MII oocytes)

| | Survival post-warming at time | |
|---|---|---|
| Total number treated | t = 0 | t = 18 hours |
| 10 | 10 intact | 10 intact |

This table shows the applied cooling protocol with CDCS dilutions (upper frame), and warming protocol with SUC. Dilutions of CDCS are expressed in % (v/v) and SUC content as a molarity (M). HTF is a culture medium for embryos, HSA stands for Human Serum Albumin. Oocytes survival/integrity directly after warming and after 18 hours culture is shown in the lower frame.

Equine Mesenchymal Stem Cells

One Step Vitrification and Warming

Figure 2:
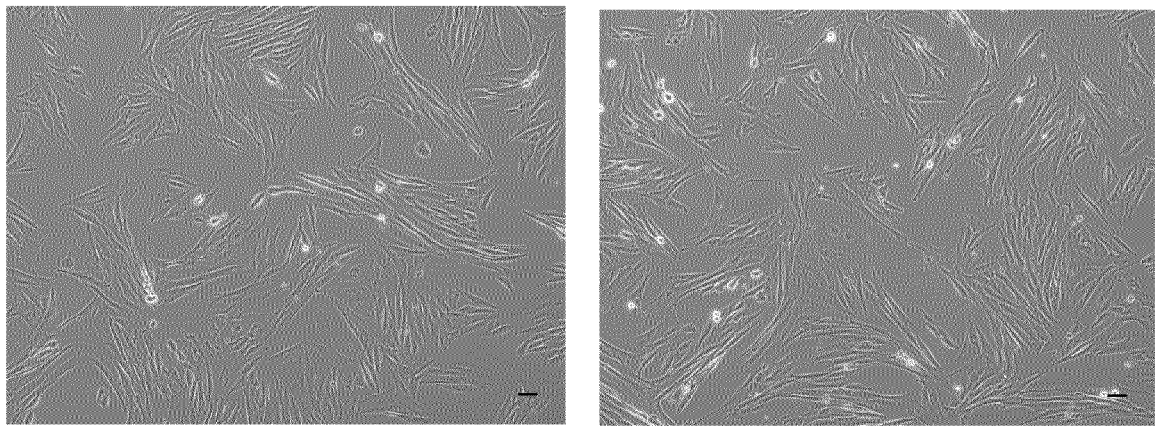
FIG. 2 represents the morphology of vitrified and non-vitrified EC-MSCs after 3 days of culture. Left side: non-vitrified controls; right side: vitrified EC-MSCs using the CDCS composition as taught herein following one-step method. Scale bar: 50 μm.

One-step vitrification followed by one-step warming procedures have been performed on EC-MSCs using CDCS in cryovials. Twenty aliquots of $10^6$ cells did undergo the vitrification/warming procedure along with 17 non-vitrified controls. Cell viability and confluency (which is a compound indicator of viability and proliferation ability) values of vitrified samples were very similar to controls (FIG. 1) although viabilities were statistically different probably owing to high repeatability of the results (reduced SD) and unavoidable cell loss during the manipulation process itself. Moreover, morphological aspects of EC-MSCs cultures either after one-step vitrification using CDCS or as non-vitrified controls are indistinguishable (FIG. 2).

Slow Freezing and Thawing

Figure 3:
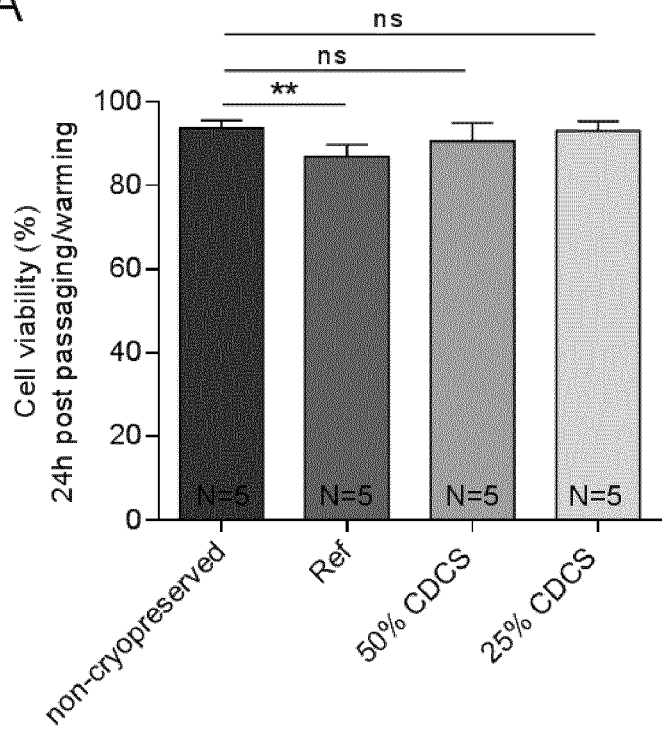
FIG. 3 represents the viability and confluency of EC-MSCs after slow freezing using 2× (i.e. 50% dilution) and 4× (i.e. 25% dilution) diluted CDCS stock solution. A: Cell Viability of EC-MSCs 24 h post thawing (cryopreserved samples) or post passaging (non-cryopreserved samples) (mean 93.7%, 86.8%, 90.6% and 93% for non-cryopreserved control, reference method (Ref), 50% CDCS and 25% CDCS samples, respectively) determined by trypan blue exclusion assay. Data represent mean+SD of 5 samples (Mann-Whitney test: **P<0.01; ns: not significant); B: Comparison of EC-MSCs confluency, reflecting the number of viable cells as well as their capability to proliferate, between the reference freezing method (Ref), 2× and 4× diluted CDCS (50% and 25% respectively) and non-cryopreserved samples. Data points represent mean±SD; the number of samples in each group is indicated between brackets.
Figure 3:
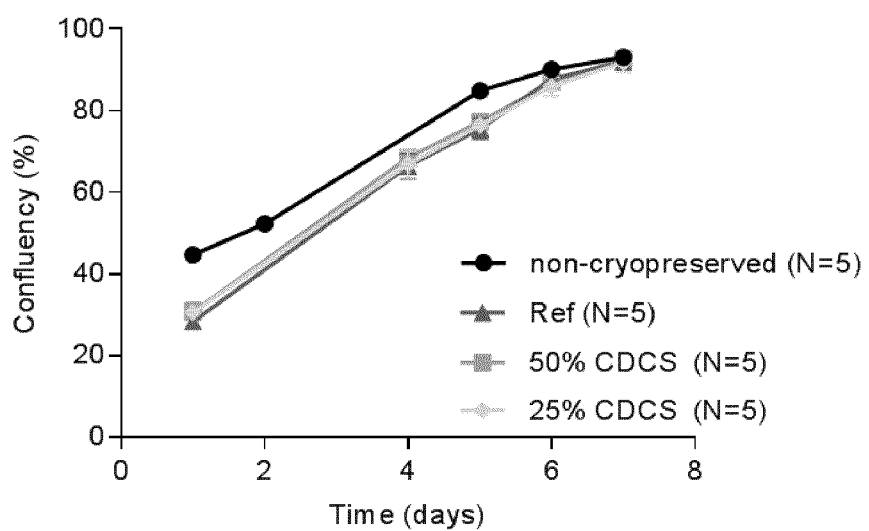

SLF has been performed on EC-MSCs using 2× and 4× diluted CDCS as well as a commonly used reference method (10% DMSO, v/v). FIG. 3 shows that both CDCS dilutions are equally as efficient as the reference method, ending up with almost equal cell viability than non-cryopreserved cells 24 hours after warming. The same applies for cell confluency where all three treatments give similar results, displaying a confluency delay of approximately 1 day compared to non-cryopreserved cells.

Human Induced Pluripotent Stem Cells (hiPSCs)

Figure 4:
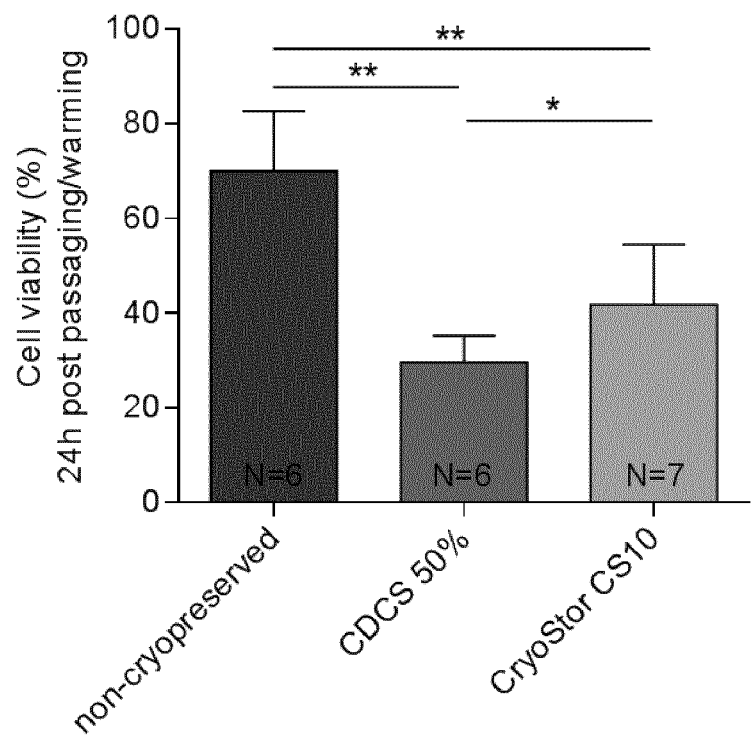
FIG. 4 represents the viability and confluency of human induced pluripotent stem cells (hiPSCs) after slow freezing using CDCS. A: Cell Viability of hiPSCs 24 h post thawing (cryopreserved samples) or post passaging (non-cryopreserved samples) determined by trypan blue exclusion assay. Data represent mean+SD of 6-7 samples from 2 independent experiments; (Mann-Whitney test: *P<0.05, **P<0.01) B: Representative example illustrating the comparison of hiPSCs confluency between frozen and non-frozen samples. Data points represent mean±SD; the number of samples in each group is indicated between brackets.
Figure 4:
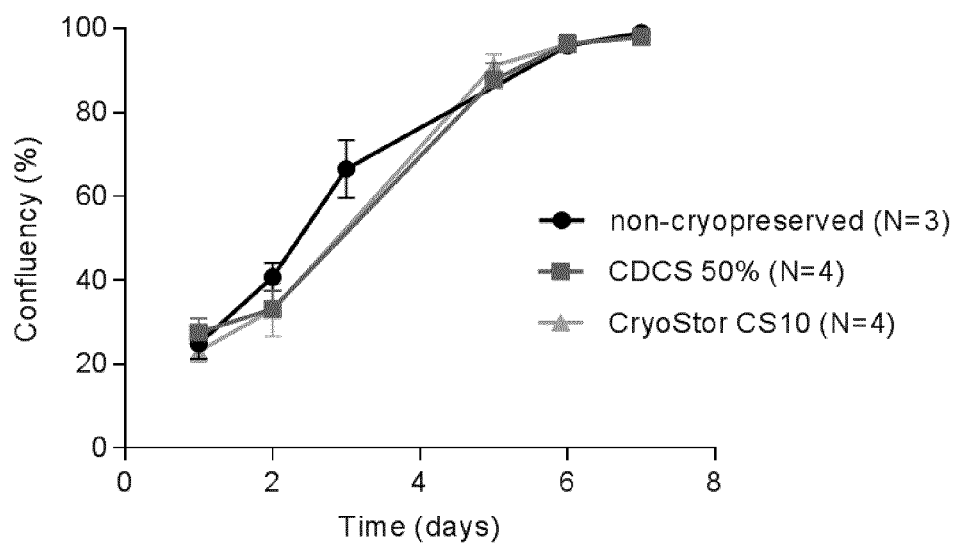

SLF has been performed on hiPSCs using 2× diluted CDCS and a commercial optimized solution (CryoStor® CS10). As shown in FIG. 4, cell viability using diluted CDCS averages 29.6% 24 hours post-thawing, which is the same order than after using CryoStor CS10 (41.8%) although statistically different. Moreover, confluency remains similar along time (1 to 7 days), reaching uncryopreserved cells level at day 5.

The results provided herein demonstrate that the compositions of the present invention provide efficient, stable, biologically safe and reproducible solutions for cryopreserving living cells, embryos and gametes of various organisms, including humans, following various methods, using various devices and in diluted or undiluted forms.

Example 2: The Compositions of Present Invention (CDCS) Allow a More Efficient Cryopreservation of Murine Embryos than Ref1 and Ref2 Solutions Materials and Methods Cryopreservation Solutions Compositions The Chemically Defined Cryopreservation Solution (CDCS) is composed as indicated in table 1 for its reference stock concentration (1× concentrated). According to protocols, this core solution can be used undiluted or diluted to address peculiar methodological/cryobiological requirements. Quantities of each of CDCS components in the undiluted stock can vary relatively to each other within the ranges indicated in table 1 without significantly altering conditioning or cryoprotective properties.

Reference cryopreservation solution 1 (also referred to herein as "Ref1 solution") refers to a cryopreservation solution as described in international patent application WO 2010/046949 A1 having a composition as described in table 9.

TABLE 9

Composition of Ref1 solution

| Component | Concentration |
|---|---|
| Ethylene glycol | 7.5% |
| DMSO | 7.5% |
| Sucrose | 0.5M |
| PVA | 0.1% |
| Ficoll | 1% |
| Hyaluronan | 0.05% |
| In HEPES-buffered culture solution | |

Reference cryopreservation solution 2 (also referred to herein as "Ref2 solution") refers to a solution described in "Lopez M. et al, Chemically defined and xeno-free cryopreservation of human adiose-derived stem cells, 2016, PLOS ONE, vol. 11(3): 1-15" having a composition as described in table 10.

TABLE 10

Composition of Ref2 solution

| Component | Concentration |
|---|---|
| Ethylene glycol | 3.5% |
| DMSO | 3.5% |
| In HEPES-buffered culture medium containing | |
| Trehalose | 0.25M |
| PVA | 2% |
| Ficoll | 5% |
| EGTA | 0.1 mM |

Physical Testing of the Vitrification Ability

The vitrification abilities of CDCS, Ref1 solution and Ref2 solution (i.e. their solidification without crystal formation) upon cooling and the absence or crystal formation upon subsequent warming has been assessed using a physical test. CDCS, Ref1 solution or Ref2 solution have been aspirated with a syringe in 250 μl french straws (Minitube ref 13407/0010) which were subsequently closed with a plug at their lower end. The straws were plunged and stirred in liquid nitrogen (LN2) and then warmed in a 37° C. waterbath.

Mouse Embryos

FVB/N×CD1 mice were used in this example. Fertilized oocytes were provided by the Central Mouse Facility of the University of Liege. Zygotes with two pronuclei and a normal-looking cytoplasm were kept for further use. If applicable, they were cultured in 50 μl drops of M16 medium under mineral oil, in water-saturated atmosphere at 37° C. under 5% $CO_2$ until treatment. Embryos at the blastocyst stage (~5 days of development) have been submitted to the vitrification/warming process.

Vitrification and Warming

Vitrification of embryos was performed using a one-step method using either the above-described CDCS, Ref1 solution or Ref2 solution solutions (hereafter referred to as "solutions").

Pre-Loading of the Straws 0.25 ml French straws (CryoBioSystem) were used as carriers for vitrifying the embryos.

The straw is connected at its cotton plug side to a 1 ml syringe. Fifty millimeters (mm) of DPBS (Gibco) supplemented with 10% fetal bovine serum (Gibco) (hereafter referred to as DPBS-F10) are loaded, followed by aspiration of 10 mm of air. The filled straws are disposed horizontally at room temperature until further use (loading of the embryos).

Conditioning and Cooling the Embryos

Briefly, groups of maximum 5 embryos are harvested from their culture medium and transferred into a 500 μl solution drop. They are moved several times into the solution to eliminate their gangue of culture medium. Then, they are harvested and transferred to 50 μl solution drops. The embryos are loaded by aspiration in the straw along with a 10 mm solution column, followed by 10 mm of air, and finally by DPBS-F10 until the cotton gets wet with the pre-loaded DPBS-F10 column. The straw is sealed and directly plunged and stirred in liquid nitrogen (LN2). From transferring the embryos into the solutions to plunging them into LN2 takes no more than 60 seconds.

Warming and Culturing the Embryos

Warming was performed at least 24 hours after cooling. The straw is taken out of LN2, allowed to warm for 5 seconds in air and directly plunged in a 37° C. water bath for 5 more seconds. The straw is wiped off and cut with scissors at its sealed end. The straw content is expelled in a 800 µl DPBS-F10 drop at room temperature with a metal rod pushing the cotton plug. The embryos are rinsed, harvested and transferred for final washing in another 200 µl DPBS-F10 drop. After rinsing, the embryos are transferred into a 50 µl drop of M16 medium under mineral oil, in water-saturated atmosphere at 37° C. under 5% $CO_2$ until further analysis.

Endpoints Recording

For the physical test of the vitrification potential, the vitrification/crystallization state of solutions upon cooling and subsequent warming was assessed by visual examination: a vitrified solution remains clear and transparent while crystallization induces a white/milky aspect.

For embryo vitrification assays, recorded endpoints were survival in culture 24 and 48 hours after warming, and hatching from the zona pellucida at 48 hours. Survival was assessed by evaluating morphology of the zona pellucida and blastomeres.

Results

Comparison of Vitrification Abilities of Solutions.

As shown in table 11, CDCS does not undergo any crystallization upon cooling in LN2 nor upon warming in a 37° C. water bath. In the same standardized conditions, Ref1 solution and Ref2 solution undergo crystallization upon cooling and upon warming. In conclusion, both Ref1 solution and Ref2 solution do not allow consistent vitrification, and allow fast crystal formation upon cooling and warming in the proposed system with relatively high thermal inertia. This fast crystallization of Ref1 solution and Ref2 solution is expected to be deleterious to the cells it may contain. CDSC thus is demonstrated to be a strong ice crystal inhibiting solution in conditions causing cooling and warming rates slower (~1.000° C./min) than generally recommended (~20.000° C./min).

TABLE 11

Physical vitrification tests of Ref1 solution and Ref2 solution and CDCS

| Cryopreservation solution | Straw ID | Cooling | Warming |
|---|---|---|---|
| Ref1 solution | Ref1-1 | C | C |
|  | Ref1-2 | C | C |
|  | Ref1-3 | C | C |
|  | Ref1-4 | C | C |
| Ref2 solution | Ref2-1 | C | C |
|  | Ref2-2 | C | C |
|  | Ref2-3 | C | C |
|  | Ref2-4 | C | C |
| CDCS | CDCS1 | V | V |
|  | CDCS2 | V | V |
|  | CDCS3 | V | V |
|  | CDCS4 | V | V |

This table reports the results of a standardized physical vitrification test. Three vitrification solutions (Ref1 solution, Ref2 solution, and CDCS) were aspirated and sealed in 250 µl french straw, cooled in LN2 and subsequently warmed in a 37° C. waterbath. The vitrified or crystallized states were assessed upon cooling and warming by visual examination.

"V" stands for vitrification and "C" for crystallization.

Embryo Vitrification Assays

It appears obvious from results reported in table 12 that, using a one-step vitrification procedure in a system with a relatively high thermal inertia, CDCS ensures a much better survival and hatching rate than Ref1 and Ref2 solutions.

TABLE 12

Vitrification and fast-rate warming of mouse embryos with Ref1 solution, Ref2 solution and CDCS

| Treatment | # Embryos | 24 H post-warming analysis | | | 48 H post-warming analysis | | | |
|---|---|---|---|---|---|---|---|---|
| | | # Surv | % Surv | | # Surv. | % Surv. | # Hatched | % Hatched |
| CDCS | 143 | $75^a$ | 52% | | $71^d$ | 50% | $12^g$ | 8% |
| Ref1 solution | 137 | $2^b$ | 1% | | $0^e$ | 0% | $0^h$ | 0% |
| Ref2 solution | 140 | $2^c$ | 1% | | $0^f$ | 0% | $0^i$ | 0% |

This table shows the results of FVB/NxCD1 mouse blastocyst stage embryos (D5) vitrification and warming, performed along with non-cryopreserved controls. CDCS was compared to Ref1 solution and Ref2 solution in one step in-straw vitrification protocols followed by warming by direct expulsion of the embryo into the culture medium. The numbers of embryos submitted to the tests are indicated (# Embryos) along with those surviving the treatment at 24 hours and 48 hours post-warming (# Surv.), developing to the hatched blastocyst stage at 48 H post-warming (# Hatched). Values with different superscripts were compared to each other and the corresponding P values were calculated using Chi square tests: a-b: $1.3 \times 10^{-21}$; a-c: $5.3 \times 10^{-22}$; d-e: $1.3 \times 10^{-21}$; d-f: $5.8 \times 10^{-22}$; g-h: $5.3 \times 10^{-4}$; g-i: $4.6 \times 10^{-4}$.

The invention claimed is:

1. A liquid composition for cryopreservation of a biological material comprising
   a polar aprotic solvent selected from dimethylsulfoxide (DMSO) and dimethylformamide (DMF),
   a monohydric or polyhydric alcohol selected from ethylene glycol, propylene glycol, glycerol, erythritol, sorbitol, mannitol, xylitol, volemitol, methanol, ethanol, isopropanol, butanol and pentanol;
   an unbranched polysaccharide selected from the group consisting of sucrose, trehalose, lactulose, melibiose, lactobionate, raffinose and cellulose;

dextran; and polyvinyl alcohol;

and wherein the dextran comprises Dextran 1, Dextran 40, and Dextran 70.

2. The liquid composition for cryopreservation of a biological material according to claim 1 comprising DMSO, ethylene glycol, sucrose, dextran and polyvinyl alcohol.

3. The liquid composition according to claim 2, wherein the composition comprises substantially equal amounts of DMSO and ethylene glycol and a concentration of sucrose which is at least 8 times that of dextran.

4. The liquid composition according to claim 1 comprising at least 0.8% (v/v) of a polar aprotic solvent;

at least 0.8% (v/v) of a monohydric or polyhydric alcohol;

at least 0.5% (w/v) of unbranched polysaccharide;

at least 0.037% (w/v) of dextran;

at least 0.015% (w/v) polyvinyl alcohol; and up to 100% (v/v/) of a diluent.

5. The liquid composition according to claim 1, comprising:

13.0-23.0% (v/v) of a polar aprotic solvent;

13.0-23.0% (v/v) of a monohydric or polyhydric alcohol;

9.0-31.0% (w/v) of an unbranched polysaccharide;

0.60-22.0% (w/v), of dextran;

0.30-4.0% (w/v) polyvinyl alcohol, and/or up to 100% (v/v) of a diluent;

or a dilution of said liquid composition in said diluent.

6. The liquid composition according to claim 1, comprising at least 15% (v/v) of a polar aprotic solvent, at least 15% (v/v) of a monohydric or polyhydric alcohol, at least 15% (w/v) of an unbranched polysaccharide, at least 2% (w/v) of dextran and about 0.9% (w/v) polyvinyl alcohol.

7. The liquid composition according to claim 4, wherein said diluent is a balanced salt solution, preferably phosphate buffered saline (PBS).

8. The liquid composition according to claim 1, comprising 17.7% (v/v) DMSO;

17.7% (v/v) ethylene glycol;

22.7% (w/v) sucrose;

0.88% (w/v) Dextran 1;

0.088% (w/v) Dextran 40;

0.88% (w/v) Dextran 70; and 0.88% (w/v) polyvinyl alcohol.

9. The liquid composition according to claim 1, wherein the liquid composition does not comprise proteins, polypeptides or peptides.

10. A method for preserving a biological material comprising the steps of providing a biological material;

contacting the biological material with the liquid composition according to claim 1; and cooling and/or heating the biological material in the liquid composition.

11. The method of claim 10, which comprises contacting the biological material with at least one dilution of a composition comprising:

13.0-23.0% (v/v) of a polar aprotic solvent;

13.0-23.0% (v/v) of a monohydric or polyhydric alcohol;

9.0-31.0% (w/v) of an unbranched polysaccharide;

0.60-22.0% (w/v), of dextran;

0.30-4.0% (w/v) polyvinyl alcohol, and/or up to 100% (v/v) of a diluent;

before contacting the biological material with said composition.

12. The method according to claim 10 wherein said cooling comprises freezing the biological material or vitrification of the biological material.

13. The method according to claim 10, wherein the biological material is selected from the group of stem cells, gametes and embryos.

* * * * *